United States Patent
Makuta et al.

(10) Patent No.: US 7,798,269 B2
(45) Date of Patent: Sep. 21, 2010

(54) MOTOR CYCLE WITH FUEL CELL AND STACK STRUCTURE OF FUEL CELL

(75) Inventors: Yohei Makuta, Saitama (JP); Yoshiyuki Horii, Saitama (JP); Kuniaki Ikui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1193 days.

(21) Appl. No.: 11/395,975

(22) Filed: Apr. 3, 2006

(65) Prior Publication Data

US 2006/0251946 A1  Nov. 9, 2006

(30) Foreign Application Priority Data

Apr. 4, 2005 (JP) .......................... P.2005-107708
May 9, 2005 (JP) .......................... P.2005-136205
May 25, 2005 (JP) .......................... P.2005-152784

(51) Int. Cl.
*B62M 7/00* (2010.01)
(52) U.S. Cl. .......................... 180/68.5; 180/220; 429/34
(58) Field of Classification Search ................. 180/219, 180/220, 68.5; 429/34, 35, 36, 38, 39
See application file for complete search history.

(56) References Cited

U.S. PATENT DOCUMENTS 6,326,765 B1  12/2001  Hughes et al.
2003/0203268 A1  10/2003  Rock
2007/0074682 A1*  4/2007  Makuta ..................... 123/41.1
2008/0166607 A1  7/2008  Muramatsu et al.

FOREIGN PATENT DOCUMENTS

| CN | 1482032 A | 3/2004 |
| EP | 1 398 263 A1 | 3/2004 |
| EP | 1 526 599 A2 | 4/2005 |
| EP | 1 627 759 A1 | 2/2006 |
| JP | 9-259912 A | 10/1997 |
| JP | 11-343878 A | 12/1999 |
| JP | 2001163063 A * | 6/2001 |
| JP | 2001/316680 A | 11/2001 |
| JP | 2002-187587 A | 7/2002 |
| JP | 2005-123114 A | 5/2005 |
| WO | WO-03/094260 A1 | 11/2003 |
| WO | WO 2005/041338 A1 | 5/2005 |

* cited by examiner

*Primary Examiner*—Kevin Hurley
(74) *Attorney, Agent, or Firm*—Birch, Stewart, Kolasch & Birch LLP

(57) ABSTRACT

The motorcycle is provided with a pipeline 84 for supplying at least hydrogen and oxygen. A fuel cell 12 is disposed below a seat 22 on which a driver sits. A connection port 80 between the fuel cell 12 and the pipe line 84 is disposed rearward of a foot step 82 on which the driver can set his foot. Accordingly, a space A necessary and sufficient for the foot step 82 is guaranteed, thereby improving a foot setting property at the time of traveling and a foot setting property at the time of stop.

7 Claims, 25 Drawing Sheets

MOTOR CYCLE WITH FUEL CELL AND STACK STRUCTURE OF FUEL CELL

The present application claims foreign priority based on Japanese Patent Applications No. P. 2005-107708 filed on Apr. 4, 2005, No. P. 2005-136205 filed on May 9, 2005, and No. P. 2005-152784 filed on May 25, 2005, the contents of them are incorporated herein by reference.

BACKGROUND OF THE INVENTION

1. Field of the Invention

The present invention relates to a motorcycle mounted with a fuel cell.

In addition, the present invention relates to a stack structure of a fuel cell in which a stacked body of power-generation cells is accommodated in a box-shaped casing, each power-generation cell having an electrolyte-electrode structure and a pair of separators between which the electrolyte-electrode structure is interposed.

Moreover, the present invention relates to a fuel cell having a valve for adjusting a pressure of an exhaust gas generated through a reaction in a fuel cell.

2. Related Art

Most of motorcycles use an internal combustion engine as a driving source. However, from the view point of environmental protection or the like, there have been developed motorcycles which are mounted with fuel cell so as to be driven by the use of electric energy obtained from the fuel cell.

The fuel cell of such a kind of motorcycle includes a fuel cell stack in which a plurality of unit fuel cells is stacked. Power generated from the fuel cell is supplied to an electric motor, thereby driving a wheel of the motorcycle.

The fuel cell generates electric power by a chemical reaction between hydrogen as the fuel gas and oxygen as the reactant gas. Accordingly, a hydrogen supply pipe for supplying hydrogen and an oxygen supply pipe for supplying oxygen are provided in such a kind of motorcycle.

In recent years, a size of the fuel cell has been increased to enhance power generation ability. Thus, the motorcycle requires a considerable space for mounting the large-sized fuel cell.

In a related art of the present invention, as shown in FIG. 22, in such a kind of motorcycle, a head pipe 2a is disposed in a front upper portion of a motorcycle body 1 and a steering axis 3 is rotatably inserted into the head pipe 2a. A handlebar 4 for steering the traveling direction of the motorcycle body is connected to the upper end of the steering axis 3. A front fork 2b is connected to the lower end of the steering axis 3 and a front wheel 5 is axially supported by the lower end portion of the front fork 2b.

A seat 6 on which a driver sits is fitted to the longitudinal center of the motorcycle body 1 approximately and a fuel cell 7 is mounted to the front lower side of the seat 6. A rear wheel 8 is axially supported in the rear portion of the motorcycle body 1, and the rear wheel 8 is driven by an electric-powered unit 9 disposed in a rear side of the fuel cell 7. Such a related example is disclosed in JP-A-2002-187587.

However, in the motorcycle of JP-A-2002-187587, since the fuel cell 7 is arranged in a front side of the seat 6 on which a driver sits, a lateral side portions of the fuel cell 7 are protruded from a lateral sides of the motorcycle body 1 at driver's foot setting positions, thereby reducing the foot setting space. Accordingly, it is difficult to improve a foot comfort.

Since the increase in size of the fuel cell 7 causes the increase in weight, a center of gravity thereof is moved when the fuel cell is disposed in the front side below the seat 6.

By the way, a polymer electrolyte fuel cell (PEFC) includes a power-generation cell in which an electrolyte membrane—electrode structure (MEA: membrane-electrode assembly) in which an anode and a cathode are disposed on both sides of an electrolyte membrane formed out of a polymer ion exchange film is sandwiched by separators. Generally, a predetermined number (for example, several tens to several hundreds) of power-generation cells are stacked in a stacked body for use so as to obtain desired power from a fuel cell. In the stacked body of the power-generation cells, it is necessary to satisfactorily pressurize and hold the power-generation cells so as to prevent increase in internal resistance of the fuel cell or deterioration in ability of sealing reactant gas. A technology of constructing a fuel cell stack by accommodating a stacked body of power-generation cells in a casing with the power-generation cells compressed in the stack direction is disclosed in JP-A-2005-123114.

FIG. 23 is an assembly diagram illustrating a first structural example of a related fuel cell stack. The fuel cell stack 200 basically includes a power-generation cell stack 201 and a hexahedral box-shaped casing 202 that accommodates the power-generation cell stack 201. The casing 202 is constructed by coupling a first end plate 211 located at one end in a stack direction of the power-generation cell stack 201, a second end plate 212 located at the other end in the stack direction, and first to fourth side panels 213, 214, 215, and 216 disposed on four planes other then the ends in a box shape. Medium supply holes 217 for supplying fuel gas or reactant gas to the power-generation cell stack 201 are formed through the first end plate 211.

Four edges of the first and second end plate 211 and 212 are subjected to an interdigitation machining and only two edges of the first to fourth side panels 213 to 216 connected to the edges of the first and second end plates 211 and 212 are subjected to the interdigitation machining so as to be coupled to the edges of the first and second end plates 211 and 212 in an interdigitating manner. The first and second end plates 211 and 212 and the first to fourth side panels 213 to 216 are connected to each other by coupling the interdigital grooves to each other in the interdigitating manner and inserting shearing pins 218 into them.

FIG. 24 is an assembly diagram illustrating a second structural example of the related fuel cell stack, where like reference numerals denote like elements.

The power-generation cell stack 201 is kept in the compressed state by coupling the first end plate 221 located at one end in the stack direction and the second end plate 222 located at the other end in the stack direction to each other with a plurality of bolts 223.

In the structure employing the shearing pins 218, as illustrated in FIG. 25, since a diameter R2 of pin holes 219 should be greater than a diameter R1 of the shearing pins 218 in consideration of dimension margin at the time of assembling the casing, a gap 220 occurs between the first and second end plates 211 and 212 and the first to fourth side panels 213, 214, 215, and 216. As a result, the pressure between the power-generation cells is not uniform, thereby deteriorating power-generation efficiency.

In the structure employing the connection bolts 223, since spaces for the bolts should be secured on the circumference of the power-generation cell stack 201, the fuel cell stack is increased in size. In this structure, the end plates 221 and 222 are fixed to each other and are also strongly fixed to a vehicle body, and the inside thereof is filled with a metal member (power-generation cells). Accordingly, when a large acceleration acts in the stack direction of the power-generation cell stack 201, gaps are formed between the end plates and the ends of the power-generation cell stack 201. When the gap is formed on the side of the first end plate 221 provided with the medium supply holes 217, the sealing ability between the end plate 221 and the power-generation cell stack 201 may be deteriorated.

Further, in a vehicle such as a motorcycle, a throttle valve is disposed in an air supply passage so as to adjusting an engine output in response to operation of an accelerator and the opening and closing of the throttle valve is performed with the operation of the accelerator.

In recent years, the amount of air supplied to an engine could be more suitably set depending upon traveling conditions of the vehicle by adjusting the opening and closing of the throttle valve by the use of a controller and a motor. In this case, the opening ratio of the throttle valve is detected and fed back by a predetermined sensor and is controlled by the controller to a predetermined target opening ratio.

An example of the throttle valve for performing the opening and closing control thereof by the use of the motor is disclosed, for example, in JP-A-11-343878. The disclosed throttle valve performs the opening and closing control of an air supply pipe by revolving a butterfly valve through a deceleration gear train under control of a predetermined controller. In this case, a potentiometer is provided in a final-stage gear disposed on a rotation axis of the butterfly valve and a feedback control is performed by detecting an amount of rotation of the rotation axis and sending the detected amount of rotation to the controller. The potentiometer includes a brush disposed on a side surface of the rotation axis and a resistor disposed on a substrate opposed to the brush. The amount of rotation is detected by allowing the brush to slide on the resistor.

Further, a gas circulating pump system for a fuel cell is disclosed in JP-A-09-259912. In the system disclosed in the document, hydrogen gas and air are supplied to the fuel cell from a hydrogen gas supply unit and an air supply unit. The hydrogen and the oxygen having passed through the fuel cell flow to the exhaust side through corresponding pressure control valves. The internal pressure of the fuel cell can be controlled by providing such pressure control valves. For example, when the pressures of hydrogen and oxygen supplied to the fuel cell are varied, the power generation of the fuel cell can be kept in a predetermined value. Accordingly, it is considered that the valve system disclosed in JP-A-11-343878 is applied to the pressure control valve of the fuel cell system disclosed in JP-A-09-259912.

However, in the throttle valve disclosed in JP-A-11-343878, since the amount of rotation of the rotation axis is detected by the potentiometer, the detection signal is an analog signal and thus electrical noise can be added thereto. When the feedback control is performed on the basis of the analog signal to which the electrical noise has been added, slight variation may occur in the butterfly valve.

Accordingly, when the valve disclosed in JP-A-11-343878 is adopted for the fuel cell system disclosed in JP-A-09-259912, it is difficult to accurately control the internal pressure of the fuel cell, thereby varying the power generation amount of the fuel cell.

SUMMARY OF THE INVENTION

One or more embodiments of the present invention provide a motorcycle mounted with a fuel cell in which a center of gravity of the motorcycle is located right below a seat so as to improve a foot setting property at the time of traveling and a foot setting property at the time of stop.

In addition, one or more embodiments of the present invention provide a stack structure of a fuel cell which can efficiently accommodating a power-generation cell stack.

Moreover, one or more embodiments of the present invention provide a fuel cell vehicle which can stabilize power generation amount of a fuel cell with a low-cost structure by adjusting an opening ratio of a flow passage with high precision so as to accurately control an internal pressure of the fuel cell.

In accordance with one or more embodiments of the present invention, a motorcycle is provided with a fuel cell body and a pipe line for supplying at least hydrogen and oxygen to the fuel cell body. The fuel cell body is disposed below a seat on which a driver sits and a connection portion between the fuel cell body and the pipe line is disposed rearward of a foot step on which the driver can put his foot. Further, in accordance with one or more embodiments of the present invention, the connection portion may be disposed on a lateral side of the motorcycle in a front end of the fuel cell body.

According to the above-mentioned configuration, a space for setting foot at the time of traveling and a foot setting property at the time of stop are satisfactorily secured. In addition, since the fuel cell body is disposed below the seat, the gravitational center of the motorcycle can be moved close to the center of the motorcycle and can be lowered.

Further, in accordance with one or more embodiments of the present invention, the connection portion may be disposed rearward of a front end of the seat. As a result, the fuel cell body can be sufficiently prevented from interfering with the foot setting space, thereby satisfactorily securing a space necessary and sufficient for a foot setting action at the time of traveling and a foot setting action at the time of stop.

Further, in accordance with one or more embodiments of the present invention, the connection portion of the fuel cell body may be disposed on both lateral sides of the fuel cell body to be inclined in a direction in which the connection portions become closer to each other about a vertical plane including a central line of the motorcycle.

Accordingly, since the pipe lines are concentrated toward the center of the motorcycle, it is possible to improve space efficiency without wasting the spaces for the foot steps more than required.

In the motorcycle according to one or more embodiments of the present invention, spaces necessary and sufficient for the foot setting action at the time of traveling and the foot setting action at the time of stop are secured, thereby improving space efficiency. In addition, it is possible to lower the gravitational center.

In addition, in accordance with one or more embodiments of the present invention, a stack structure of a fuel cell is provided with: a power-generation cell stack in which a plurality of power-generation cells is stacked; and a casing member that accommodates the power-generation cell stack. The casing member is provided with: a first end plate disposed at one end in a stack direction of the power-generation cells; a second endplate disposed at the other end in the stack direction of the power-generation cells; and a plurality of side plates disposed at positions other than the ends. The stack structure having the following features:

(1) The stack structure may be provided with: a first fixing structure for supporting the first end plate so as to be movable in the stack direction of the power-generation cells with respect to the side plates; and a second fixing structure for fixing the second end plate so as not to be movable in the stack direction of the power-generation cells with respect to the side plates.

(2) Medium supply holes may be formed through the first end plate.

(3) The edges of the first end plate and the edges of the side plates may be coupled to each other in an interdigitating manner and may be fixed by shearing pins passing through interdigital grooves, and the edges of the second end plate and other edges of the side plates may be coupled to each other with bolts.

(4) A screw-coupling direction of the bolts may be substantially equal to the stack direction of the power-generation cells.

According to the stack structure described above, the following advantages can be obtained.

(1) Since the first end plate of the casing member is movable in the stack direction of the stacked body, the first end plate can be displaced in the same direction along with the stacked body even when an acceleration acts on the fuel cell stack in the same direction as the stack direction. Accordingly, it is possible to prevent a gap from occurring between the first end plate and the stacked body.

(2) Since the supply hole for oxygen-containing gas and the supply hoe for hydrogen-containing gas are formed in the first endplate, the first endplate is moved in the same direction along with the stacked body and no gap occurs between both even when an acceleration acts on the fuel cell stack in the same direction as the stack direction. Accordingly, it is possible to prevent the leakage of oxygen-containing gas and hydrogen-containing gas.

(3) The movable fixation of the first end plate to the side panels and the non-movable fixation of the second plate to the side panels can be embodied with a simple structure.

(4) Even when an acceleration acts on the fuel cell stack in the same direction as the stack direction, no stress acts on the bolts in a shearing direction. Accordingly, it is possible to improve durability of the fuel cell stack.

In addition, in accordance with one or more embodiments of the present invention, a fuel cell vehicle is provided with: a fuel cell for generating electric power by reacting a reactant gas with a hydrogen gas; reactant gas supply means for supplying the reactant gas to the fuel cell; hydrogen gas supply means for supplying the hydrogen gas to the fuel cell; and a valve for controlling a pressure of an exhaust gas generated through the reaction in the fuel cell. The fuel cell vehicle travels by the use of the electric power generated by the fuel cell. The valve is provided with: a valve body connected to a valve axis rotating so as to open and close a flow passage; a motor revolving the valve axis; an encoder connected to an output axis of the motor so as to output a pulse signal indicating an amount of rotation of the output axis; and a controller for controlling the driving of the motor so as to allow a opening ratio of the valve body to be equal to a target opening ratio thereof on the basis of the amount of rotation provided from the encoder.

In this way, by controlling the opening ratio of the valve body in accordance with the pulse signal output from the encoder, the influence of the electrical noise can be reduced to suppress vibration of the valve body, thereby controlling the opening ratio of the flow passage with high precision. Since the encoder has an excellent linearity and an excellent temperature characteristic in comparison with an analog sensor such as a potentiometer, the encoder can accomplish desired precision with relatively low cost. By using such a valve as a pressure control valve of a fuel cell system, the internal pressure of the fuel cell can be accurately controlled, thereby stabilizing the power generation amount of the fuel cell. The stabilization of power generation amount can improve, for example, the traveling ability of the fuel cell vehicle.

In this case, a deceleration mechanism for decelerating the rotation of the output axis of the motor and delivering the rotation to the valve axis may be disposed between the motor and the valve axis. Accordingly, the rotation of the valve axis is accelerated and delivered to the encoder, thereby substantially enhancing the resolution for detecting the rotation of the valve axis. Even when a noise is applied to the output signal of the encoder, the influence of the noise can be reduced in accordance with the deceleration ratio of the deceleration mechanism, thereby suppressing the vibration of the valve body.

In addition, the deceleration mechanism may comprise a plurality of gears and reinforcement means for reinforcing engagement between the gears. Accordingly, the sliding between the gears in the deceleration mechanism can be prevented, thereby enhancing the precision in the opening ratio of the valve.

In the fuel cell vehicle according to one or more embodiments of the present invention, the influence of electrical noise can be reduced by controlling the opening ratio of the valve body in accordance with the pulse signal output from the encoder. As a result, the slight vibration of the valve axis can be prevented, thereby controlling the opening ratio of the flow passage with high precision. Since the encoder has an excellent linearity and an excellent temperature characteristic in comparison with an analog sensor such as a potentiometer, the encoder can accomplish desired precision with relatively low cost.

Moreover, since the internal pressure of the fuel cell can be accurately controlled by using such a valve as a pressure control valve of the fuel cell system, the power generation of the fuel cell can be stabilized, thereby improving the traveling ability of the fuel cell vehicle.

Other aspects and advantages of the invention will be apparent from the following description and the appended claims.

REFERENCE NUMERALS AND CHARACTERS

10: MOTORCYCLE
12: FUEL CELL
18: HANDLEBAR
20: FRAME
22: SEAT
80: CONNECTION OPENING
82: FOOT STEP
84: PIPE LINE
A: SPACE
145: TAPPING HOLE
146: BUNG HOLE
150: FUEL CELL STACK
151: FUEL CELL UNIT
185: POWER-GENERATION CELL STACK
186: MEDIUM SUPPLY HOLE
188, 189: INTERDIGITAL GROOVE
190: CASING
191: FIRST END PLATE
192: SECOND END PLATE
193-196: SIDE PANEL
197: SHEARING PIN
310: MOTORCYCLE
312: FUEL CELL
318: HANDLEBAR
320: FRAME
322: SEAT
380: CONNECTION OPENING
382: FOOT STEP
384: PIPE LINE
445: TAPPING HOLE
446: BUNG HOLE
450: FUEL CELL STACK
451: FUEL CELL UNIT
485: POWER-GENERATION CELL STACK
486: MEDIUM SUPPLY HOLE
488, 489: INTERDIGITAL GROOVE
490: CASING
491: FIRST END PLATE
492: SECOND END PLATE
493-496: SIDE PANEL
497: SHEARING PIN

DETAILED DESCRIPTION OF THE EXEMPLARY EMBODIMENTS

Exemplary embodiments of the invention will be described with reference to the accompanying drawings.

First Exemplary Embodiment

Figure 1:
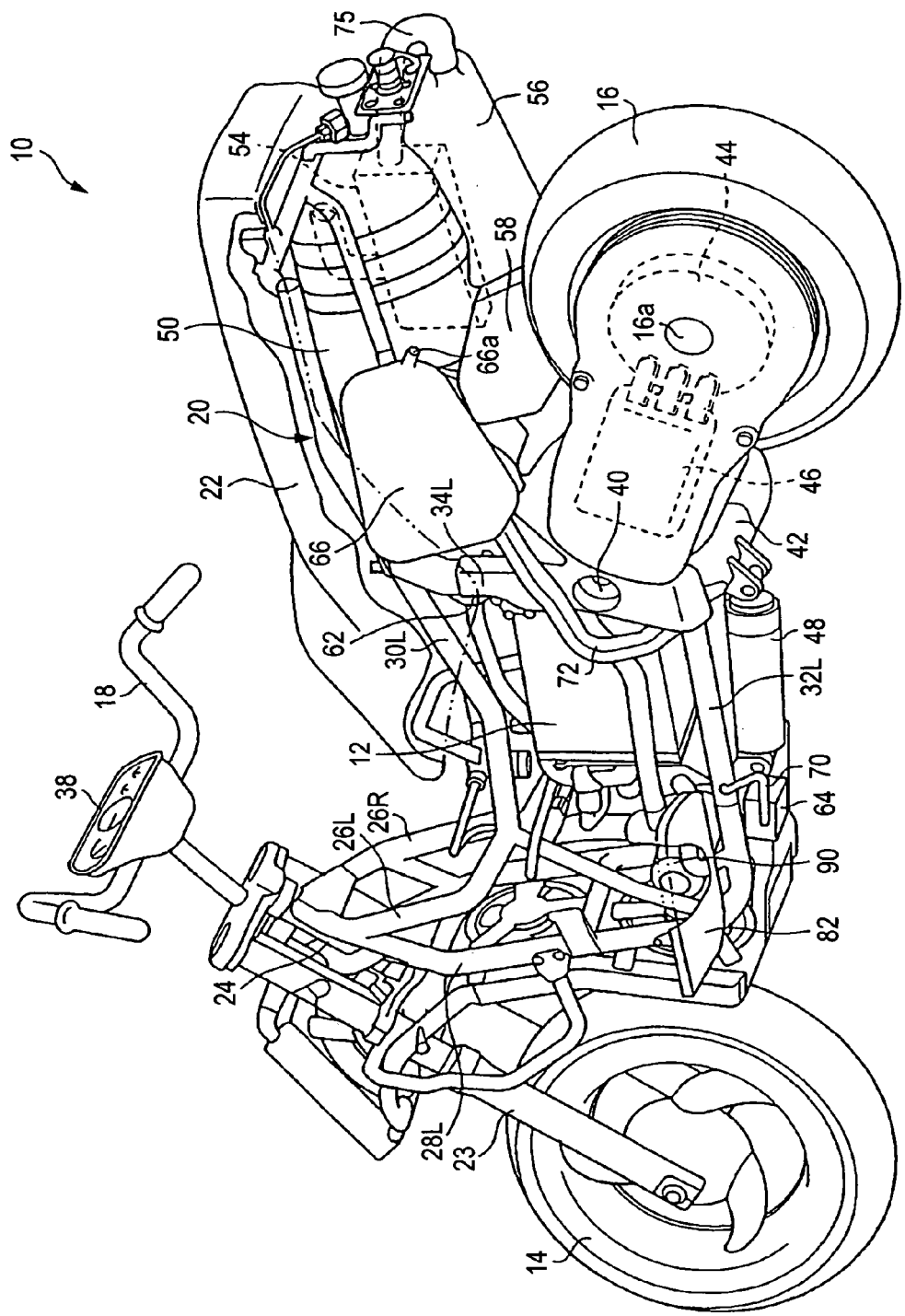
FIG. 1 is a perspective view illustrating a motorcycle according to an exemplary embodiment of the present invention.
Figure 2:
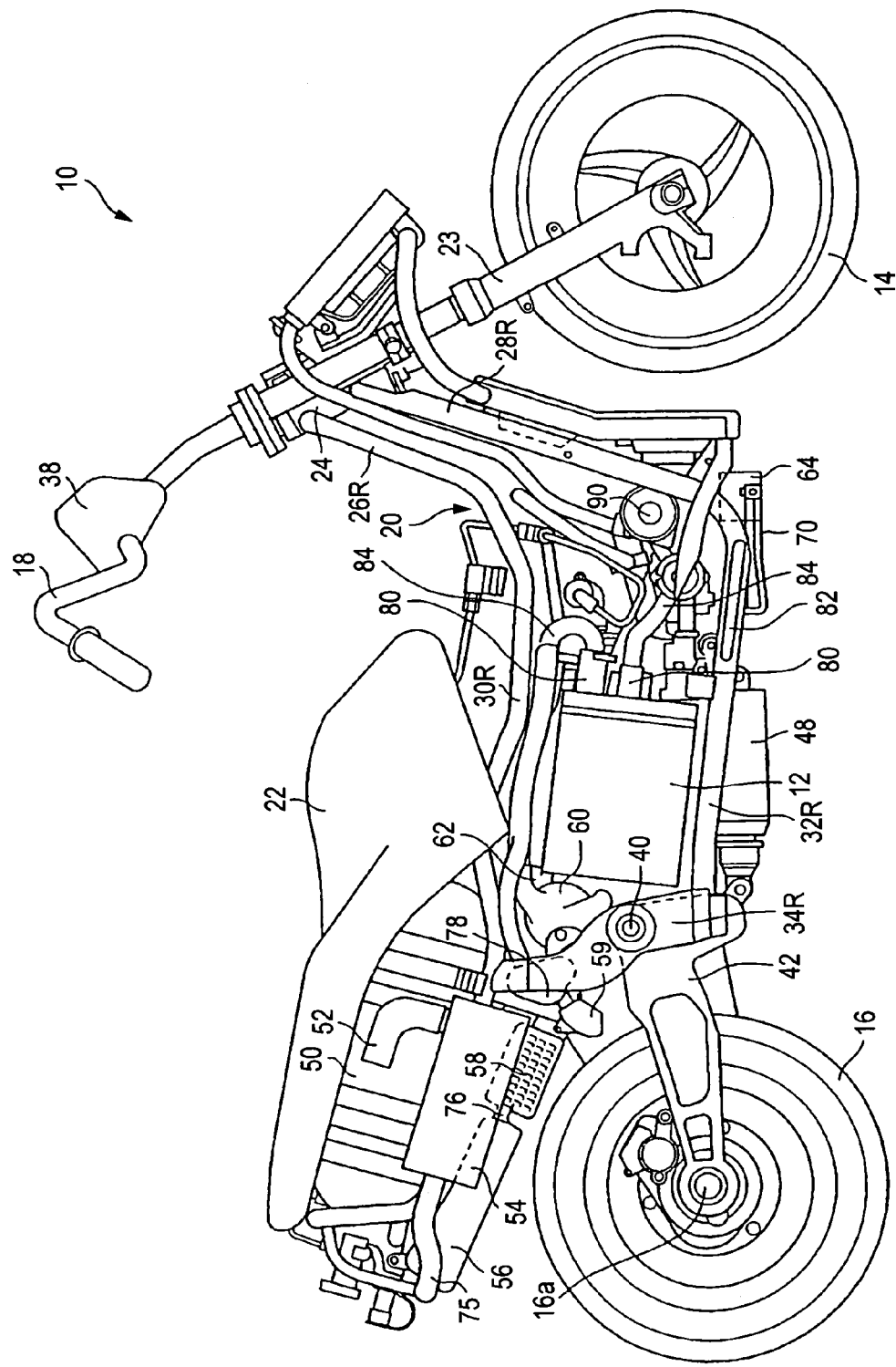
FIG. 2 is a side view illustrating the motorcycle shown in FIG. 1.

FIG. 1 is a perspective view illustrating a motorcycle according to an exemplary embodiment of the present invention as seen from a rear side, where a scooter-type motorcycle is exemplified. FIG. 2 is a side view of the motorcycle shown in FIG. 1 and FIG. 3 is a schematic plan view of the motorcycle shown in FIG. 1.

Figure 3:
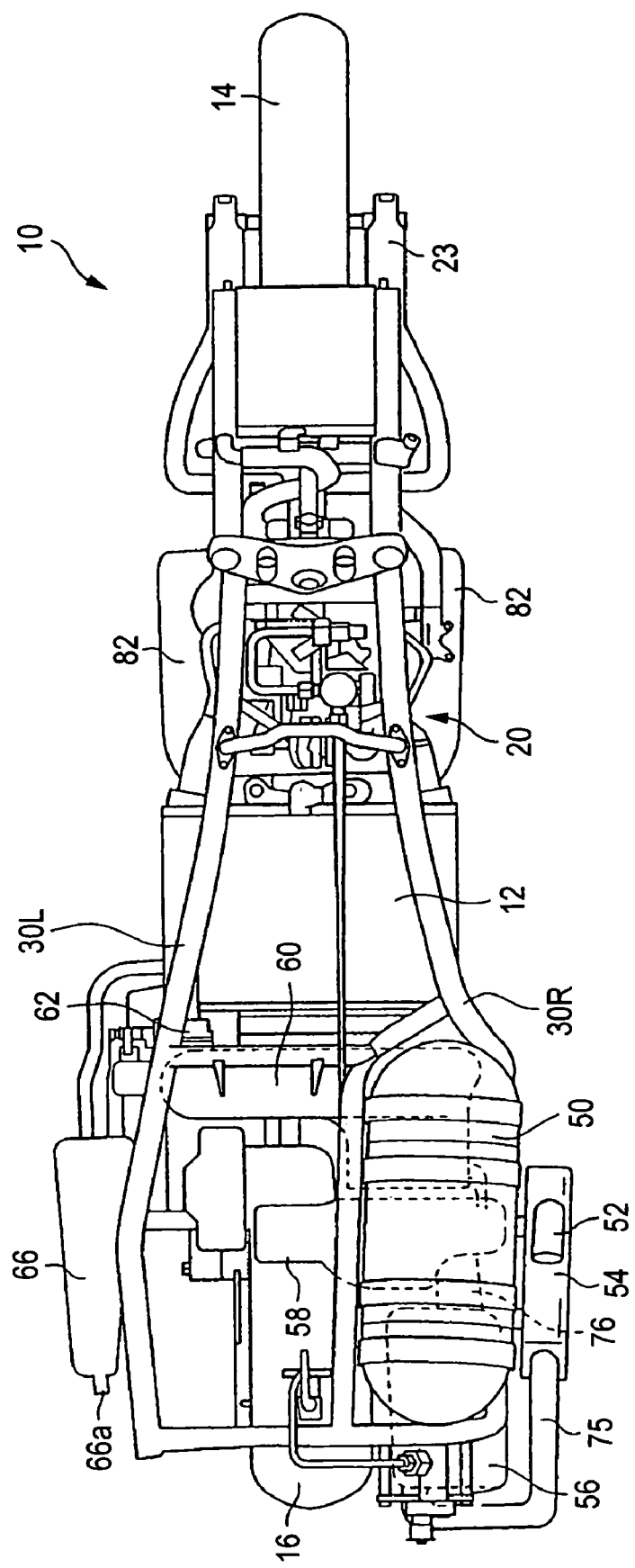
FIG. 3 is a plan view schematically illustrating the motorcycle shown in FIG. 1.

In FIGS. 1 to 3, the motorcycle 10 includes a fuel cell 12 and travels by the use of power obtained from the fuel cell 12. The fuel cell 12 generates power by allowing a fuel gas (hydrogen gas) supplied to an anode to react with a reactant gas (air) supplied to a cathode. In an embodiment, since a known fuel cell is employed as the fuel cell 12, detailed description thereof will be omitted.

The motorcycle 10 includes a front wheel 14 as a steering wheel, a rear wheel 16 as a driving wheel, a handle bar 18 connected to the front wheel 14 so as to steer the traveling direction of the motorcycle 10, a frame 20, and a seat 22 which is disposed in a rear side of the handlebar 18 and on which a driver and a passenger sit.

Between the handlebar 18 and the seat 22, as described later, low-bottomed foot steps 82 are protruded from both lateral sides of the frame 20.

The motor cycle according to the present exemplary embodiment has a water-cooled cooling system (not shown) for cooling the fuel cell 12 into a proper temperature range so as to efficiently carry out power generation.

The frame 20 has a head pipe 24 for axially supporting a fork-shaped front suspension 23 at the front side and a pair of upper down frame 26R and 26L and a pair of lower down frames 28R and 28L in which the front portions are connected to the head pipe 24.

The frame 20 includes upper frames 30R and 30L extending continuously from upper down frames 26R and 26L so as for tails thereof to go upward to the rear side, lower frames 32R and 32L extending continuously from lower down frames 28R and 28L to the rear wheel 16, and vertical frames 34R and 34L connecting the rear ends of the lower frames 32R and 32L to intermediate portions of the upper frames 30R and 30L, respectively.

At the approximate center of the motorcycle body, the fuel cell 12 is disposed below the rear side from the front end of the seat 22. Specifically, the fuel cell is disposed in a rear side of a region defined by the upper frames 30R and 30L, the lower frames 32R and 32L, and the vertical frames 34R and 34L and the tail thereof goes upward slightly.

The fuel cell 12 is a part having a relatively large weight among parts constituting the motorcycle 10. Accordingly, by disposing the fuel cell below the seat 22 at the approximate center of the motorcycle body, the gravitational center of the motorcycle 10 can be disposed at the center of the motorcycle body.

Figure 4:
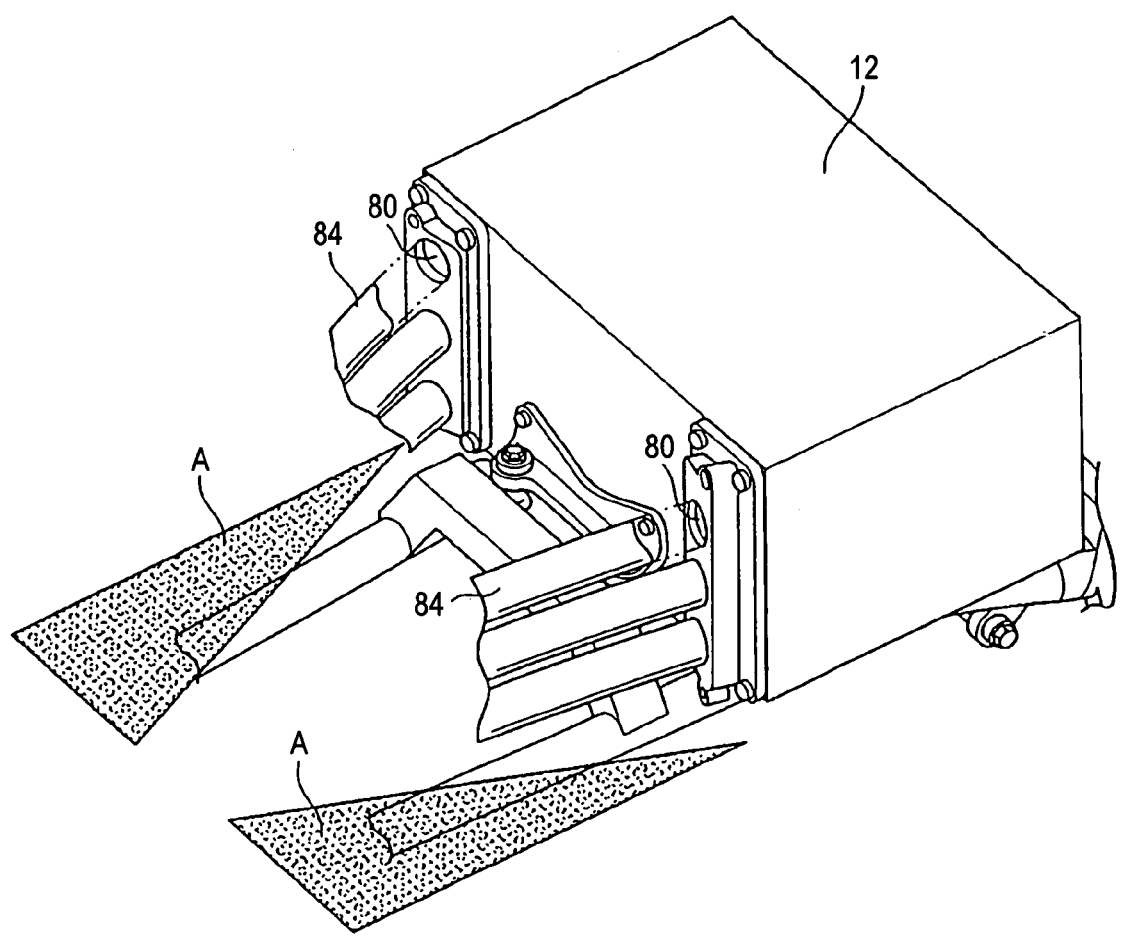
FIG. 4 is a perspective view illustrating a fuel cell and spaces for a foot step of the motorcycle shown in FIG. 1.

As shown in FIG. 4, a plurality of connection ports 80, each of which is a connection portion of a pipe 84 such as a hydrogen supply pipe for supplying hydrogen and an oxygen supply pipe for supplying oxygen, is in the vehicle width direction at the front end of the fuel cell 12. The connection ports 80 are disposed in a rear side of the front end of the seat 22 and in a rear side of the foot steps 82.

Figure 5:
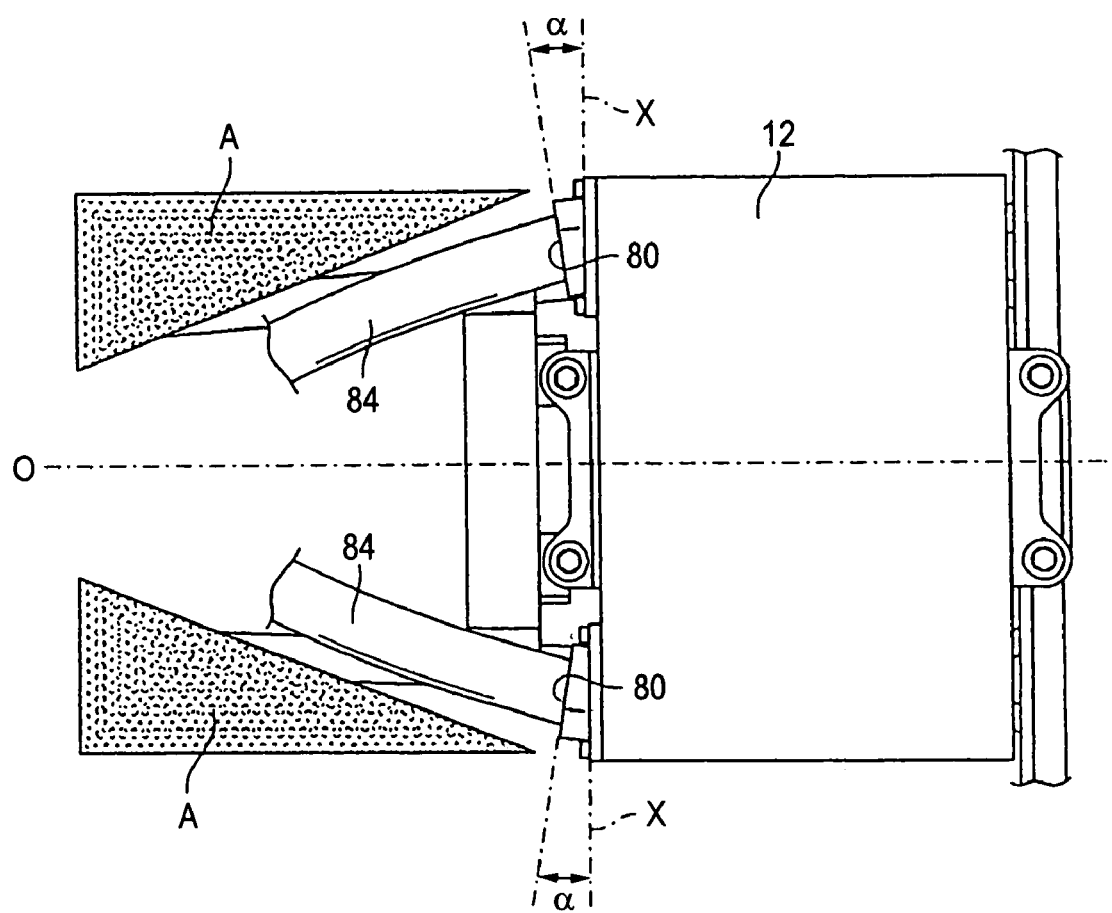
FIG. 5 is a partial plan view illustrating a fuel cell and spaces for the foot step of the motorcycle shown in FIG. 1.

In addition, the connection port 80 are disposed on both sides of the front end of the fuel cell 12. Here, as shown in FIG. 5, supposed that line X is perpendicular to the center line O of the motorcycle body, the front end angle of the connection ports is tilted by a° about line X in the direction in which the connection ports 80 become close to each other about the center line O of the motorcycle body. The pipes 84 are formed out of steel pipes or high-pressure tubes.

In the present embodiment, an electric pump 90 to be described later is disposed in front of the fuel cell 12 in the region defined by the upper frames 30R and 30L, the lower frames 32R and 32L, and the vertical frames 34R and 34L. The seat 22 is disposed above the upper frames 30R and 30L and a tail lamp (not shown) is disposed at the rear end thereof.

The front wheel 14 is axially supported by the lower end of a front suspension 23. A handlebar 18 is connected to the upper portion of the front suspension 23 and a meter 38 for displaying a traveling speed and a traveling distance is disposed at the center of the handlebar 18.

The rear wheel 16 is supported by a swing arm 42 which can rotate about a pivot 40 disposed in the vertical frames 34R and 34R. An in-wheel motor 44 and a motor driver 46 for driving the in-wheel motor 44 are disposed integrally with the rear wheel 16.

The in-wheel motor 44 and the motor driver 46 are preferably of a water cooling type. This is because a high efficiency and a high power can be attained. A rear suspension 48 is disposed below the fuel cell 12 to extend in the longitudinal direction of the motorcycle body and both ends thereof are rotatably connected to the lower frames 32R and 32L and the swing arms 42.

The fuel cell 12 is designed to have the least height above the ground. However, by disposing the rear suspension 48 below the fuel cell 12, a space between the fuel cell 12 and the ground can be effectively used and the gravitational center of the motorcycle 10 can be lowered.

Next, the motorcycle 10 according to the present exemplary embodiment includes a fuel tank 50 for storing fuel gas supplied to the fuel cell 12 with a high pressure, a resonator 54 for reducing air suction sound from an air suction port 52 opened to the rear side, and an air cleaner 56 for receiving external air through the resonator 54, which all constitute a fuel cell system for generating power by the use of the fuel cell 12.

The air suction port 52 is disposed on the top surface of the front side of the resonator 54, is smoothly bent by about 90°, and is opened to the rear side.

In addition, as can be easily seen from FIGS. 1 and 2, the fuel tank 50, the resonator 54, and the air cleaner 56 are disposed above the rear wheel 16.

The motorcycle 10 further includes a compressor 58 (also referred to as super charger or pump) for compressing air cleaned by the air cleaner 56 into reactant gas, an intercooler 59 for cooling the reactant gas compressed by the compressor 58, a humidifier 60 for exchanging moisture between the reactant gas supplied to the fuel cell 12 and the used reactant gas exhausted from the fuel cell 12, a back-pressure valve 62 disposed on the exhaust side of the humidifier 60 so as to adjust an internal pressure of the fuel cell 12, a dilution box 64 for diluting the used reactant gas with the used oxygen gas, and a silencer 66 for silencing and exhausting the diluted reactant gas to the air as exhaust gas.

In this case, the motorcycle 10 preferably includes a secondary battery (not shown) in the vicinity of the front fork as an auxiliary power source of the fuel cell system.

As shown in FIGS. 1 and 2, the fuel tank 50, both ends of which have a semi-sphere shape, is disposed on a lateral side from the center of the motorcycle body at the rear portion of the motorcycle body, that is, at a position offset to right in the present embodiment.

Specifically, the fuel tank 50 extends in the longitudinal direction of the motorcycle body as seen from the top side (see FIG. 3) and the tail thereof goes upward along the seat 22 and the upper frame 30R as seen from the lateral side (see FIG. 2).

The fuel tank 50 is a part having a relatively large size among the parts constituting the motorcycle 10. However, in the present embodiment, since the fuel tank is disposed at the position offset from the center of the motorcycle body, the fuel tank does not overlap with the rear wheel 16 as seen from the top side, thereby sufficiently securing a vertical suspension stroke of the rear wheel 16. Accordingly, impacts from the road surface can be easily alleviated, thereby further improving a smooth ride of the motorcycle 10.

The dilution box 64 is disposed at the lower end between a pair of lower down frames 28R and 28L and at a position lower than the fuel cell 12. Accordingly, the moisture generated through the power generation of the fuel cell 12 can be easily collected in the dilution box 64 and thus the collected moisture is easily exhausted downwardly from the bottom of the dilution box 64.

A first exhaust pipe 70 is connected to the dilution box 64 and the exhaust gas is discharged from the first exhaust pipe 70. The first exhaust pipe 70 extends from the slight front portion rather than the center of the lower frame 32L through the inner portion of the lower frame 32L to the rear side and the rear end thereof is connected to a second exhaust pipe 72.

The second exhaust pipe 72 is bent at a slight upper portion rather than the rear end of the lower frame 32L, extends upwardly to the rear side, and is connected to the silencer 66.

The silencer 66 which has a vertically flat rectangular shape is offset to left from the center of the rear portion of the motorcycle body and extends in the longitudinal direction of the motorcycle body at a position higher than the rear wheel 16.

An exhaust port 66a for discharging the exhaust gas from the silencer 66 is disposed below the rear end of the silencer 66. The exhaust port 66a is disposed in the slight rearward of a vehicle axis 16a of the rear wheel 16 in the longitudinal direction of the motorcycle body.

In this way, since the exhaust port 66a is disposed at the position higher than the rear wheel 16 and in a rear side of the vehicle axis 16a in the longitudinal direction, the exhaust gas discharged from the exhaust port 66a is diffused and discharged backwardly by traveling wind. Accordingly, steam (or moisture) contained in the exhaust gas can be suppressed from going down to the rear wheel 16. Even when the motorcycle 10 travels with a small turning radius, the steam flies obliquely in the rear side, thereby suppressing the steam from going down to the rear wheel 16.

The resonator 54 has a vertically flat rectangular shape and is disposed in the left side of the fuel tank 50. The rear end of the resonator 54 and the rear end of the air cleaner 56 are connected to each other through a resin pipe 75.

The air cleaner 56 has a slightly flat shape and is disposed so as for its rear end to go upward in a rear side of the fuel tank 50. The air having passed through the air cleaner 56 is guided into the right end of the compressor 58 through the short resin pipe 76.

The compressor 58 is disposed to extend in the lateral direction of the motorcycle body and the right end thereof is disposed below the center of the fuel tank 50. The humidifier 60 has a longitudinal shape in the lateral direction of the motorcycle body and is disposed between the compressor 58 and the fuel cell 12.

The intercooler 59 is disposed below the front portion of the fuel tank 50 and an air inlet and an air outlet thereof are connected to the compressor 58 and the humidifier 60, respectively. As described above, the intercooler 59 serves to cool the external air compressed by the compressor 58 and supply the cooled air to the humidifier 60. However, at the time of starting in cool weather, the compressed external air can be supplied to the fuel cell 12 without passing through the intercooler 59 and the humidifier 60 by switching a bypass valve 78.

In the motorcycle 10 according to the present exemplary embodiment, since the fuel cell 12 is disposed below the seat 22, the connection ports 80 of the fuel cell 12 are disposed rearward of the front end of the seat 22, and the fuel cell 12 is disposed rearward of the foot step 82, the fuel cell 12 does not overlap with the space A for the foot step 82 (see FIGS. 4 and 5).

Figure 6:
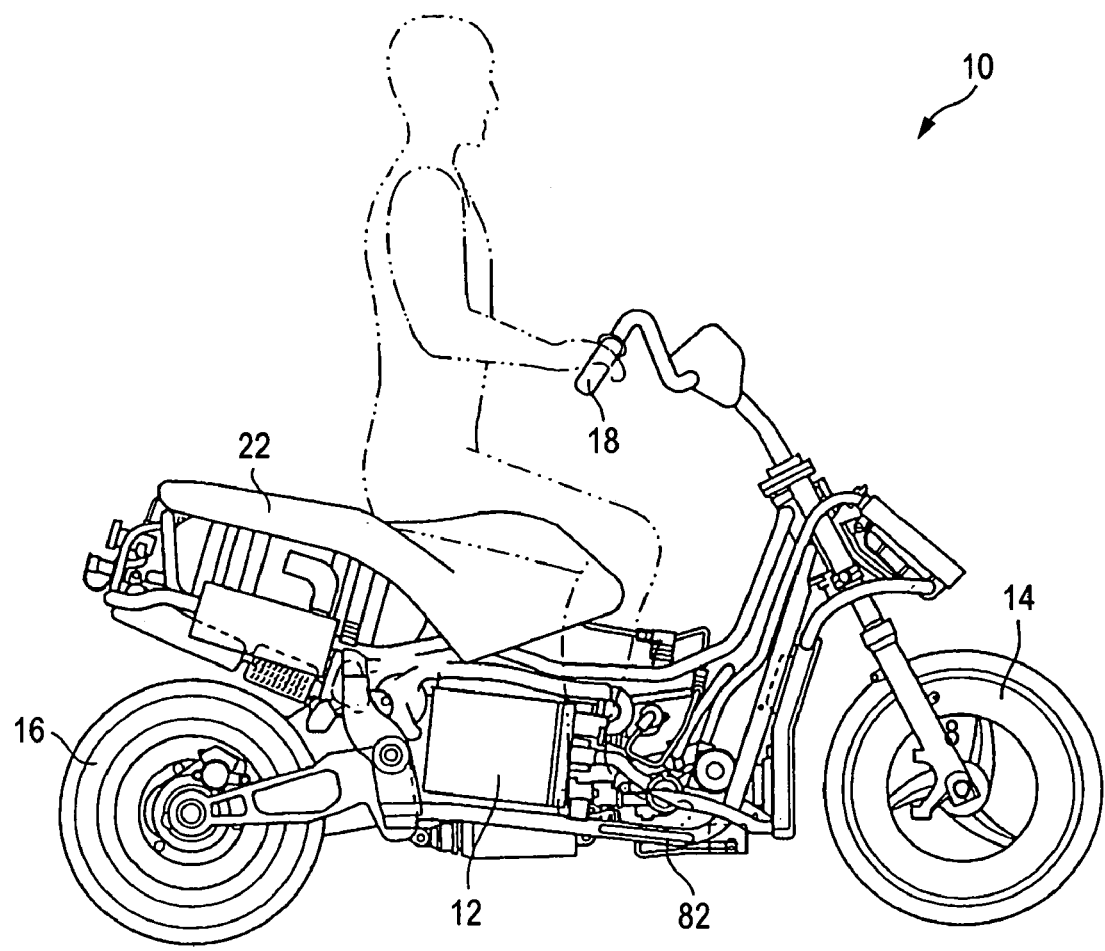
FIG. 6 is a schematic side view illustrating the motorcycle shown in FIG. 1 at the time of traveling.
Figure 7:
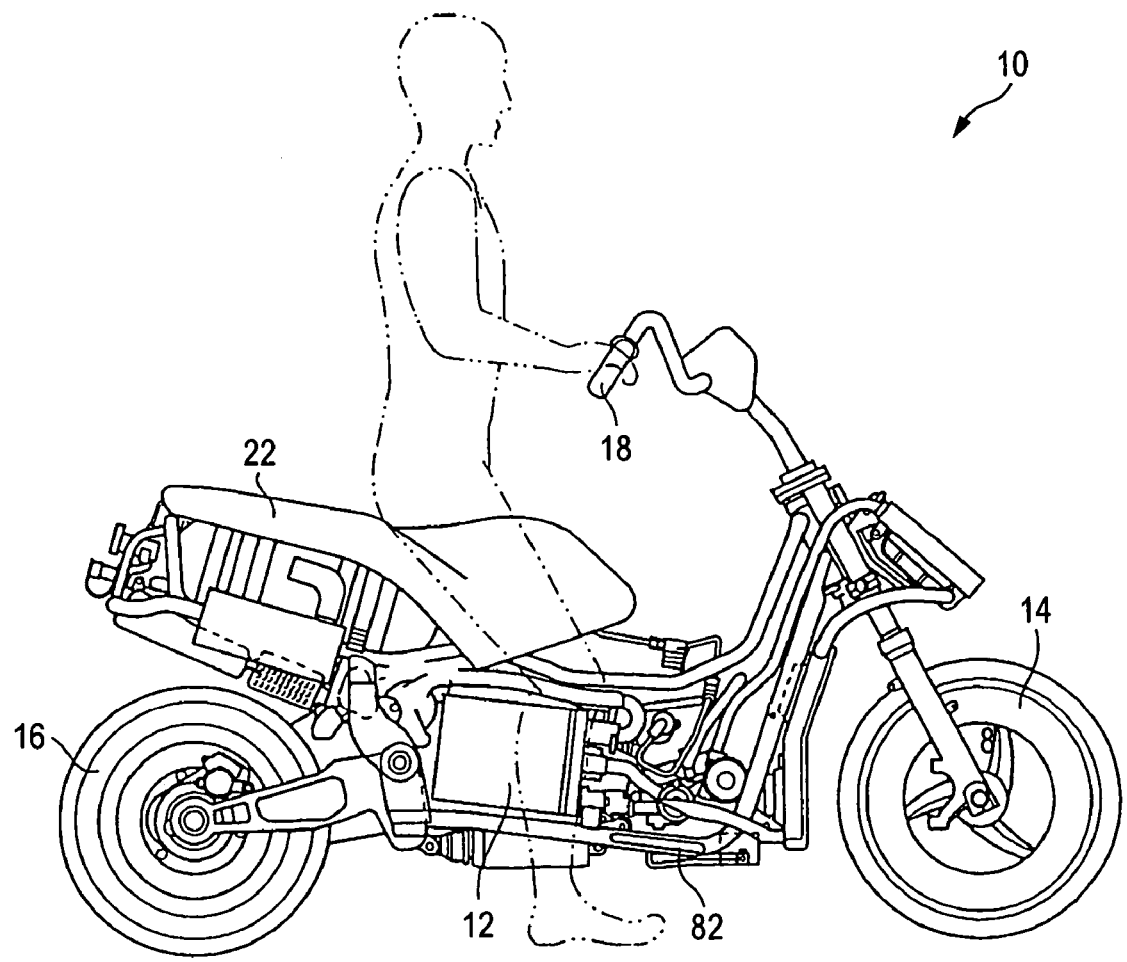
FIG. 7 is a schematic side view illustrating the motorcycle shown in FIG. 1 at the time of stop (with a foot placed on the ground).

That is, since the fuel cell 12 does not interfere with the space A for the foot step 82, the space A necessary and sufficient for a foot setting action at the time of traveling shown in FIG. 6 and a foot setting action at the time of stop shown in FIG. 7 is secured.

In addition, since the connection ports 80 are disposed on both sides of the front end of the fuel cell 12 and the front ends thereof are tilted by a predetermined angle $\alpha°$ in the direction of being close to each other about the vertical plane including the center line O of the motorcycle body, the pipes 84 are concentrically disposed at the center of the motorcycle body, thereby improving the space efficiency.

That is, the space A of the foot step 82 can be effectively utilized and the space A necessary and sufficient for the foot setting action at the time of traveling and the foot setting action at the time of stop can be guaranteed, thereby improving the space efficiency.

In addition, since the fuel cell 12 is disposed below the seat 22, the lowering of gravitational center of a vehicle can be accomplished.

Second Exemplary Embodiment

In the following description, directions such as a longitudinal direction and a lateral direction are equal to those of a vehicle if there is no specific description. In the drawings, arrow FR denotes a forward direction of a motorcycle, arrow LH denotes a left direction of the motorcycle, and arrow UP denotes an upward direction.

Figure 8:
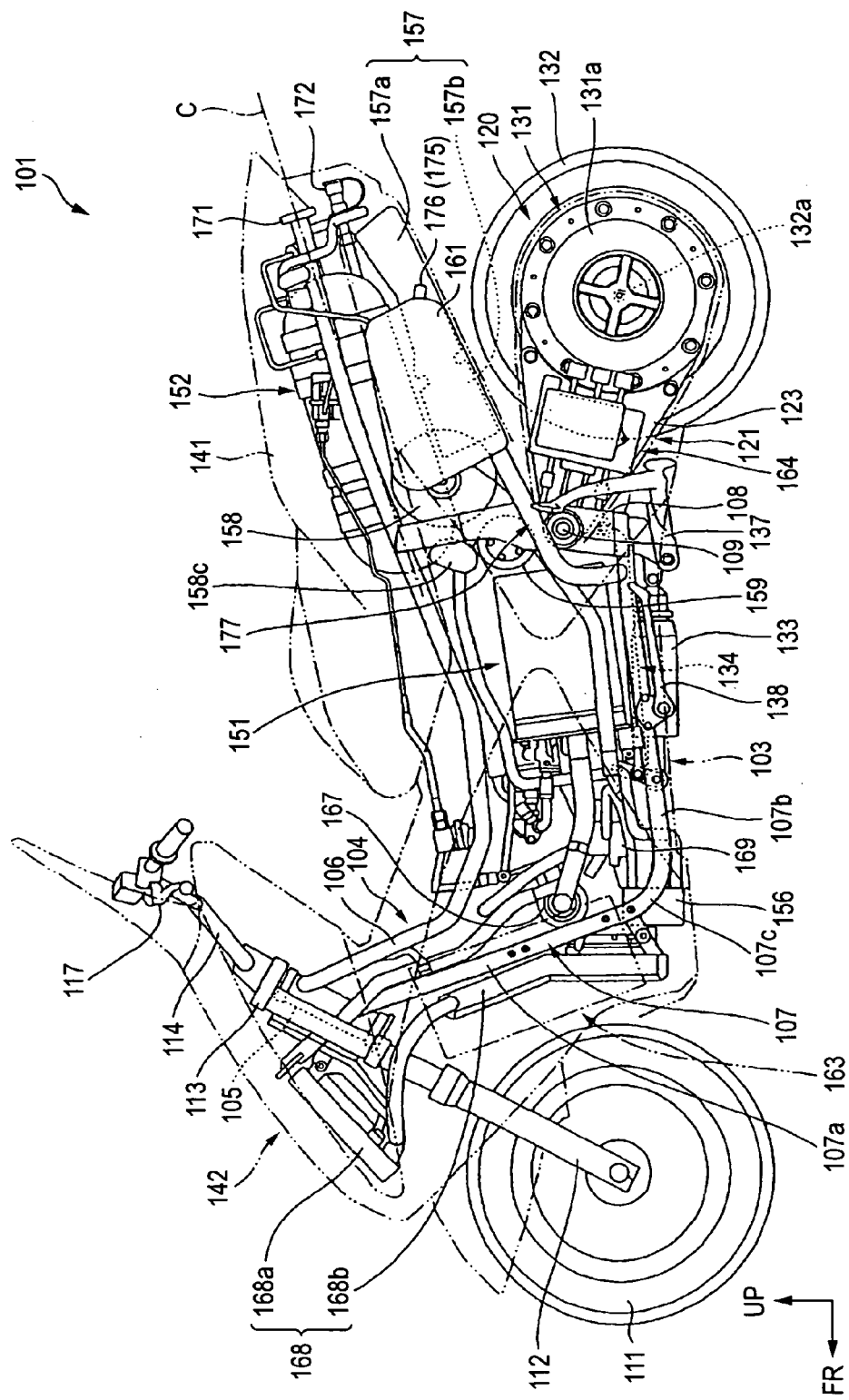
FIG. 8 is a left side view illustrating a fuel cell vehicle (motorcycle) according to an exemplary embodiment of the present invention.
Figure 9:
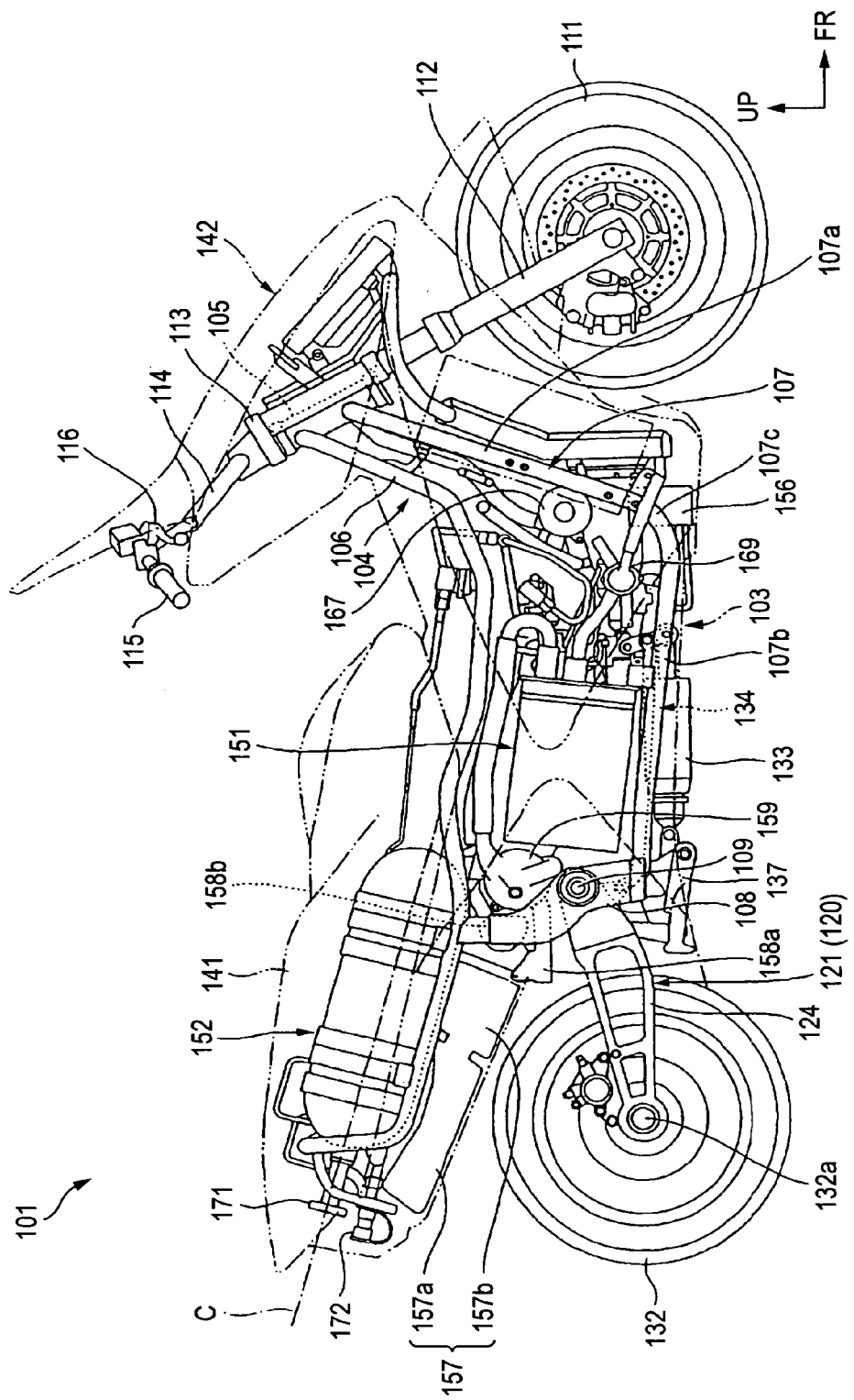
FIG. 9 is a right side view illustrating the fuel cell vehicle.
Figure 10:
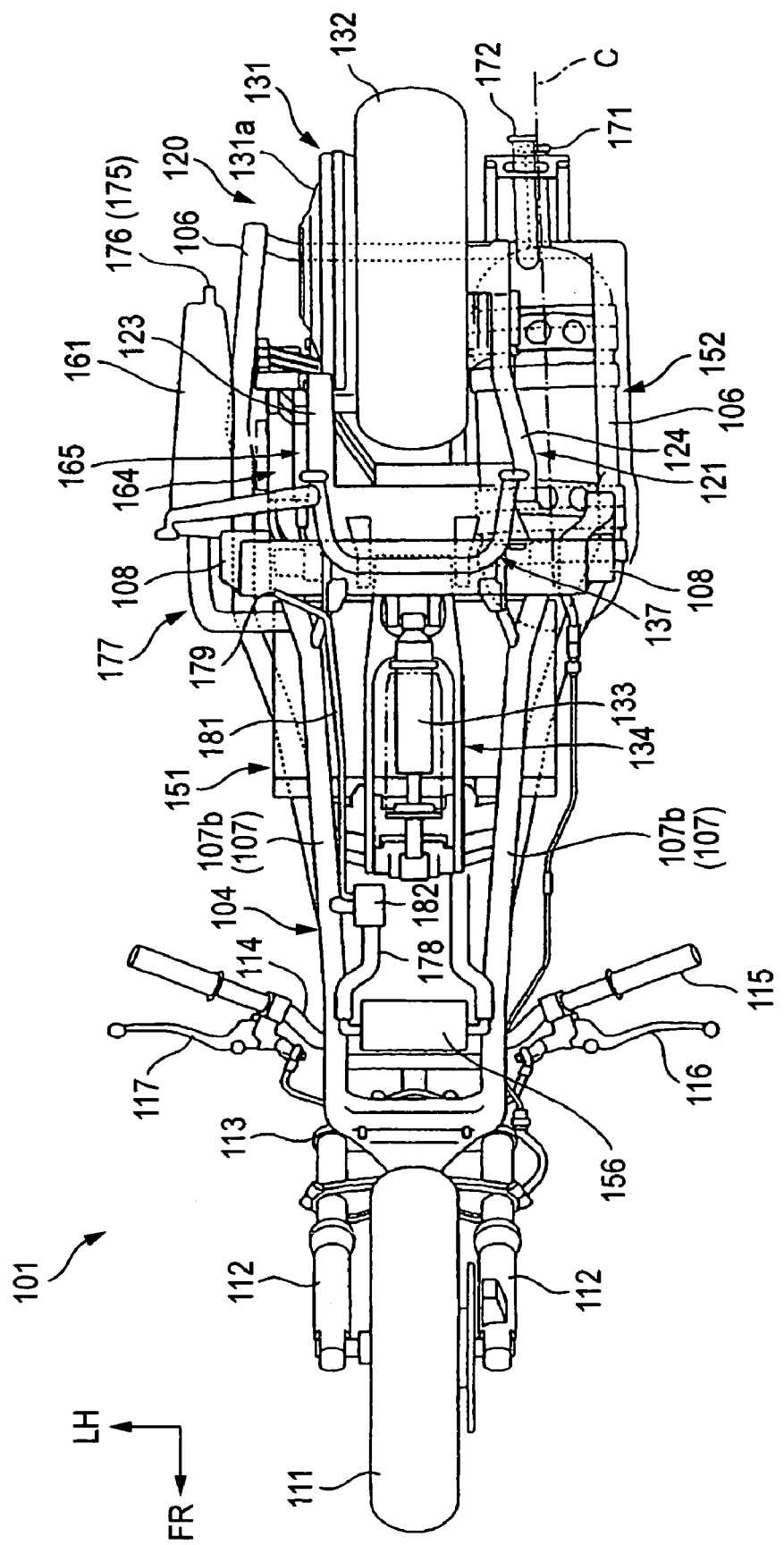
FIG. 10 is a bottom view illustrating the fuel cell vehicle.

A motorcycle 101 shown in FIGS. 8 to 10 is a fuel cell vehicle which travels by driving a motor 131 for driving the vehicle by the use of power supplied from a fuel cell unit 151 mounted at the approximate center of the vehicle body. The motorcycle 101 is of a scooter type having a bottom floor portion (hereinafter, simply referred to as floor portion) in the vehicle body, where the fuel cell unit 151 is disposed in the vicinity of the floor portion 103 and the motor 131 as a so-called wheel motor is disposed inside a rear wheel 132 as a driving wheel of the motorcycle 101. The motor 131 is embodied as an integrated unit having a motor body and a deceleration mechanism in a casing 131a and the output axis thereof is disposed coaxial with a wheel axis 132a of the rear wheel.

A front wheel 111 of the motorcycle 101 is axially supported by the lower ends of a pair of front forks 112 and the upper ends of the front forks 112 are supported to be steered by a head pipe 105 in the front end of a vehicle frame 104 through a steering stem 113. A handlebar 114 is disposed at the upper end of the steering stem 113. A throttle grip 115 is disposed in a right grip portion of the handlebar 114 and rear and front brake levers 116 and 117 are disposed in front of the left and right grip portions, respectively.

A pivot plate 108 extending in a vertical direction of the vehicle body is provided at the front side of the vehicle frame 104 and the front end of a rear swing arm 121 is supported slightly below the center of the pivot plate 108 with a pivot axis 109 therebetween so as to make the rear end movable in the vertical direction. A left arm body 123 of the rear swing arm 121 extends to the front end of the motor 131 and supports the casing 131a of the motor 131, while a right arm body 124 extends to the center of the rear wheel 132 and supports the wheel axis 132a of the rear wheel. A motor unit 120 as a swing unit of the motorcycle 101 basically includes the rear swing arm 121 and the motor 131.

A reaction 133 extending in the longitudinal direction of the vehicle body is disposed below the vehicle frame 104 and below the fuel cell unit 151. The rear end of the reaction 133 is connected to the lower portion of the vehicle frame 104 and the front end thereof is connected to the lower portion of the motor unit 120 (the rear swing arm 121) through a link mechanism 134. The link mechanism 134 serves to allow the longitudinal stroke of the reaction with the vertical movement of the motor unit 120. Impact or vibration acting on the motor unit 120 is absorbed by the stroke of the reaction 133.

The vehicle frame 104 includes upper tubes 106 being branched to left and right from the upper portion of the head pipe 105, extending obliquely to the back side, being bent at the height corresponding the approximate center in the vertical direction of the vehicle body, and then extending to the back side and down tubes 107 being branched to left and right from the lower portion of the head pipe 105, extending obliquely to the back side, being bent at the lower end of the vehicle body, and then extending to the back side. The rear ends of the upper tubes 106 and the rear ends of the down tubes 107 are coupled to the upper end and the lower end of the pivot plate 108 located in back of the fuel cell unit 151, respectively. Hereinafter, a portion from the head pipe 5 to a bent portion 107c of the lower end of the vehicle body is referred to as a front edge portion 107a and a portion from the bent portion 107c to the pivot plate 108 is referred to as a lower edge portion 107b. The upper tubes 106 further extends to the back side from the pivot plate 108 to reach the rear end of the vehicle body and the rear portions of the upper tubes 106 are used as a seat frame supporting a seat 141 for allowing a passenger to ride thereon.

The motorcycle 101 is covered with a vehicle cover 142 made of synthetic resin. The vehicle cover 142 also serves as a windshield and a part thereof constitutes the floor portion 103 along with the vehicle frame 104. The lower center of the vehicle frame 104 is fitted with a main stand 137 for supporting the vehicle body in its upright state and the lower left portion of the vehicle frame 104 is fitted with a side stand 138 for supporting the vehicle body in its rising state in which the vehicle body is inclined to left.

Figure 11:
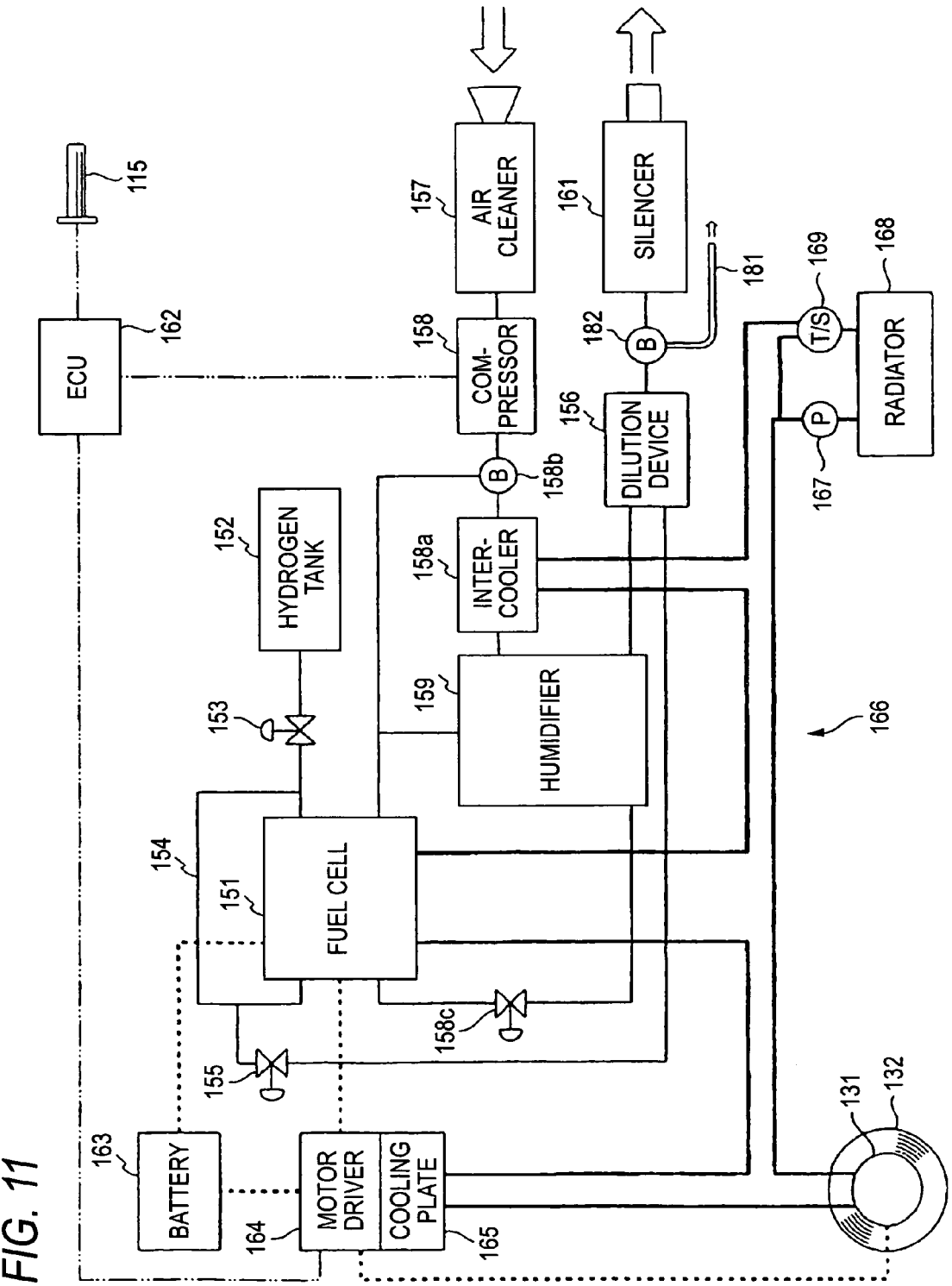
FIG. 11 is a block diagram illustrating a partial configuration of a fuel cell system in the fuel cell vehicle.

Now, a fuel cell system of the motorcycle 101 will be described in brief with reference to FIG. 11. The fuel cell unit 151 is a known polymer electrolyte membrane fuel cell (PEMFC) in which a plurality of unit cells (power-generation cells) is stacked and generates electric power and water through electrochemical reaction by supplying hydrogen gas as fuel gas to an anode and supplying oxygen as oxidizing gas to a cathode.

The hydrogen gas as fuel gas is supplied to the fuel cell unit 151 through a blocking valve 158 from a hydrogen tank 152 with a predetermined pressure and then is guided to a hydrogen circulating passage 154 after being used for power generation. In the hydrogen circulating passage 154, the remaining (non-reacted) hydrogen gas joins new hydrogen gas guided from the hydrogen tank 152 and then is supplied to the fuel cell unit 151 again. The hydrogen gas circulating through the hydrogen circulating passage 154 is guided to a dilution device 156 through a purge valve 155.

On the other hand, air as the oxidizing gas is guided to a compressor 158 through an air cleaner 157, is supplied to the fuel cell unit 151 in a compressed status with a predetermined pressure, and is then guided to the dilution device 156 after being used for power generation. Reference numeral 158a denotes an intercooler for cooling the air (oxidizing gas) supplied to the fuel cell unit 151, reference numeral 159 denotes a humidifier for supplying moisture to the oxidizing gas, reference numeral 158b denotes a bypass valve for supplying the air without passing through the intercooler 158a and the humidifier 159 when the fuel cell unit 151 is at a low temperature or the like, and reference numeral 158c denotes a back-pressure valve for adjusting the pressure of the oxidizing gas in the fuel cell unit 151.

By allowing the purge valve 155 disposed in the hydrogen circulating passage 154 to be opened, the hydrogen gas after reaction is guided into the dilution device 156, is mixed and diluted with the exhaust gas from the fuel cell unit 151 by the dilution device 156, and then is discharged to the air through a silencer 161. Here, water generated from the fuel cell unit 151 is collected when it is guided into the humidifier 159 along with the exhaust gas and is reused as moisture supplied to the oxidizing gas. The moisture (for example, steam) not collected in the humidifier 159 is discharged through the dilution device 156 along with the gases after reaction, or is discharged through a water discharge pipe (an exhaust pipe) 181 after being condensed by the dilution device 156. The water discharge pipe 181 is provided with a control valve 182 for switching a water passage at a predetermined time.

The operation of the fuel cell unit 151 is controlled by an electronic control unit (ECU) 162. Specifically, the ECU 162 receives signals relating to the pressure and the temperature of the hydrogen gas and the oxidizing gas, signals relating to a vehicle speed and the number of rotation of the compressor 158, and signals relating to the temperature of the fuel cell unit 151 and a cooling water thereof and controls operations of the compressor 158, the bypass valve 158b, the back-pressure valve 158c, the purge valve 155, and the blocking valve 153 in response to the received signals.

In addition, the ECU 162 receives an acceleration request signal from a throttle grip 115 and controls the driving of the motor 131 for driving the rear wheel 132 in response to the received signal. The motor 131 is embodied as a three-phase AC motor in which DC current from the fuel cell unit 151 or a battery 63 as a secondary cell is converted into three-phase AC current by a motor driver 164 as an inverter unit and then is supplied for drive.

A cooling system in the fuel cell system forms a cooling water passage 166 for connecting water passages in water jackets of the fuel cell unit 151 and the motor 131, in the intercooler 158a, and in a cooling plate (cooler) 165 adjacent to the motor driver 164 and the cooling water passage 166 is provided with a water pump 167 and a radiator 168.

In such a cooling system, by allowing the cooling water to flow and circulate through the cooling water passage 166 by means of the operation of the water pump 167, the cooling water absorbs heat from the fuel cell unit 151, the motor 131, the oxidizing gas, and the motor driver 164 and the absorbed heat is released through the radiator 168. Reference numeral 169 denotes a thermostat allowing the cooling water to circulate without passing through the radiator 168 when the fuel cell unit 151 is at the low temperature.

Referring to FIGS. 8 to 10, the hydrogen tank 152 is a general high-pressure gas tank having a cylindrical shape, a general high-pressure gas tank made of metal and fiber-reinforced plastic, and a general complex vessel made of metal and fiber-reinforced plastic. The hydrogen tank is disposed so that the axial line C thereof extends in the longitudinal direction at the rear right side of the vehicle body, specifically, so that the axial line C goes down slightly. The right end (outer end) of the hydrogen tank 152 is located slightly outside the outer end of the upper tube 106 at the right side of the vehicle body and the left end (inner end) thereof is located slightly outside the outer end of the rear wheel 132.

The front and rear ends of the hydrogen tank 152 are formed in the form of sphere (in other words, a tapered shape). The front end is located in front of the pivot plate 108 and the rear end is located at the rear end portion of the vehicle body. The rear end of the hydrogen tank 152 is provided with a main tap 171 and a hydrogen injection port 172 of the hydrogen tank 152.

The upper tube 106 at the left side of the vehicle body is slightly oblique to go upwardly and extends approximately straightly to the back side, while the upper tube 106 at the right side of the vehicle body is smoothly curved downwardly in the vicinity of the pivot plate 108 with respect to the upper tube 106 at the left side of the vehicle body. The upper tubes 106 are smoothly curved to the outside in the lateral direction of the vehicle body in the vicinity of the pivot plate 108.

The upper tube 106 at the right side of the vehicle body is disposed so that the lower end thereof approximately overlaps with the lower end of the hydrogen tank 152 as seen from the lateral side of the vehicle body, is bent upwardly at the rear end portion of the vehicle body, extends to the left side of the vehicle body to avoid the main tap 171 and the hydrogen injection port 172 of the hydrogen tank 152, is bent downward, and then is coupled to the rear end of the upper tube 106 at the left side of the vehicle body.

The fuel cell unit 151 has a shape wide in the lateral direction of the vehicle body and flat in the vertical direction, and the front edge portion is provided with an inlet and an outlet for the oxidizing gas and the hydrogen gas and an inlet and an outlet for the cooling water, respectively. The humidifier 159 having a case longitudinal in the lateral direction of the vehicle body is closely disposed in back of the upper portion of the fuel cell unit 151. The compressor 158 is closely disposed in the oblique back of the left upper portion of the humidifier 159 and the left portion of an inflow duct 157b extending in the lateral direction of the vehicle body is connected to the oblique back side of the lower portion of the compressor 158. The back-pressure valve 158c is closely disposed above the left portion of the compressor 158.

The right portion of the inflow duct 157b is located below the hydrogen tank 152 and the right portion is connected to the front end of an air cleaner case 157a located below the hydrogen tank 152. An air suction duct not shown is connected to the rear end of the air cleaner case 157a and the air cleaner 157 basically includes the air cleaner case 157a and the inflow duct 157b.

The bypass valve 158b is closely disposed in back of the right portion of the humidifier 159 and the intercooler 158a is closely disposed in the oblique back of the lower portion of the bypass valve 158b. The bypass valve 158b and the intercooler 158a are disposed between the right portion of the humidifier 159 and the right portion of the inflow duct 157b in the longitudinal direction of the vehicle body. The downstream portion of the compressor 158 is connected to the intercooler 158a through an outflow duct not shown.

At the left rear side of the vehicle body, the silencer 161 flat in the lateral direction of the vehicle body is disposed at the outer side in the lateral direction of the upper tube 106 at the left side of the vehicle body. The silencer 161 has a quadrangular shape as seen from the lateral side of the vehicle body and is disposed in an oblique posture which goes upward to the back side at the left upper side of the rear wheel 132. The silencer 161 is disposed in the rear portion of the exhaust pipe 177 going up obliquely to the rear side. A tail pipe 175 is protruded backward from the rear end of the silencer 161 (the exhaust pipe 177) and an exhaust port 176 for reacted gas is formed at the rear end of the tail pipe 175.

The radiator 168 includes a relatively small-sized upper radiator 168a located in front of the head pipe 105 and a relatively small-sized lower radiator 168b located in front of the front edge portions 107a of the down tubes 107. The water pump 167 is disposed in back of the right portion of the lower radiator 168b and the thermostat 169 is disposed in the oblique back of the lower portion of the water pump 167. Batteries 163 flat in the lateral direction of the vehicle body are disposed inside the vehicle cover 142 located on both sides of the lower radiator 168b.

The dilution device 156 is disposed between the bent portions 107c of the down tubes 107 so as to be protruded downward from the lower end of the lower edge portions 107b. A short exhaust pipe 178 is drawn from the dilution device 156 and is connected to the front end of the lower edge portion 107b of the down tube 107 at the left side of the vehicle body, and the exhaust pipe 177 is drawn from the rear end of the lower edge portion 107b. That is, the down tube 107 at the left side of the vehicle body constitutes a part of the exhaust pipe for the reacted gas and thus the exhaust gas from the dilution device 156 is discharged to the air through the short exhaust pipe 178, the lower edge portions 107b of the down tube 107, and the exhaust pipe 177.

The water discharge pipe 181 branched by the control valve 182 extends backward along the lower edge portion 107b of the down tube 107 at the left side of the vehicle body. The water discharge pipe 181 is disposed at the left side of the reaction 133 to overlap with the reaction 133 as seen from the lateral side of the vehicle body (see FIG. 12). The rear portion of the water discharge pipe 181 is bent obliquely to the rear left side.

Figure 12:
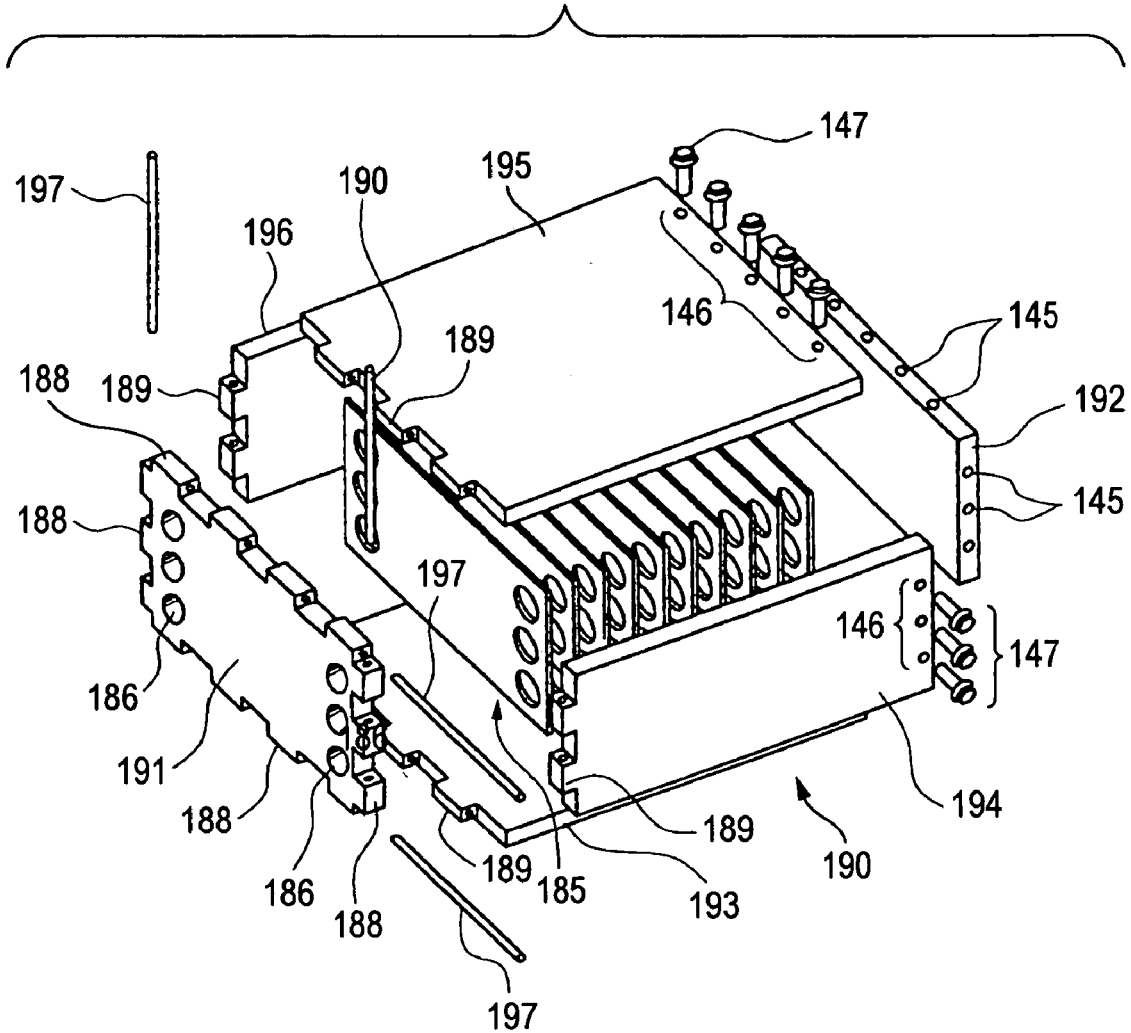
FIG. 12 is an assembly diagram illustrating an example of a fuel cell stack.
Figure 13:
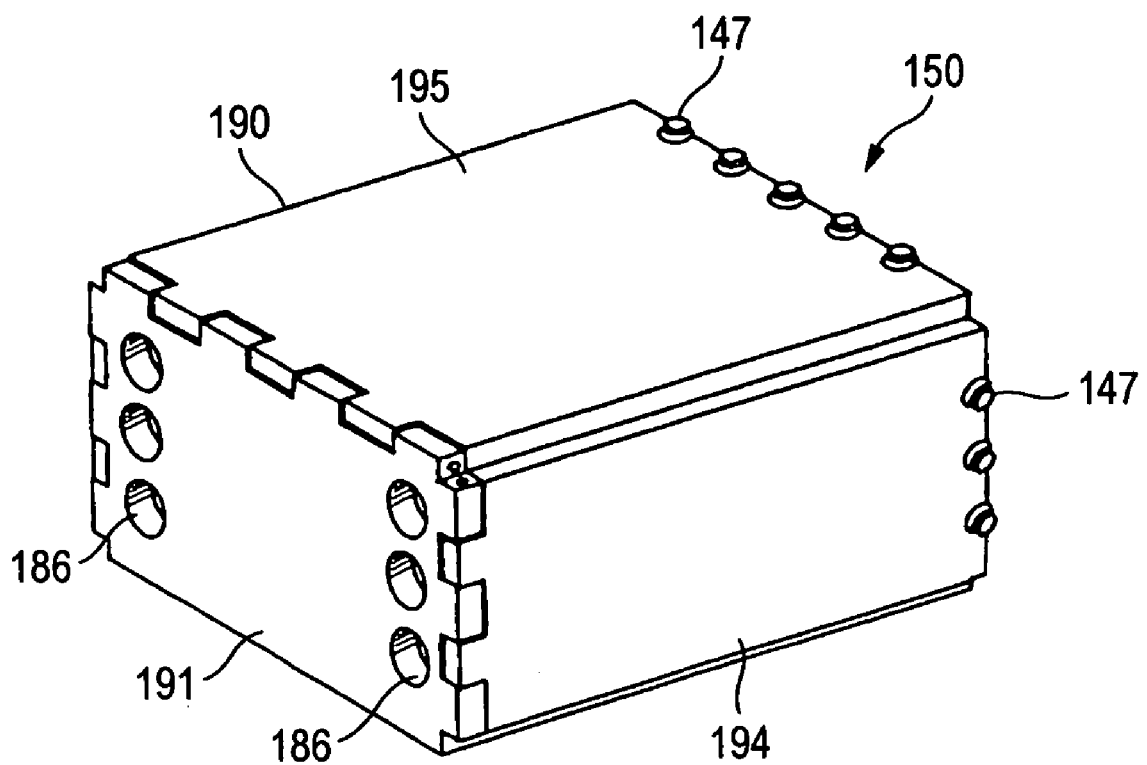
FIG. 13 is a perspective view illustrating an example of the fuel cell stack.

FIG. 13 is a perspective view illustrating the fuel cell stack 150 according to an exemplary embodiment of the present invention and FIG. 12 is an assembly diagram thereof The fuel cell stack 150 is accommodated in the fuel cell unit 151 and is supported to guarantee a space for exhausting gas between planes of the unit case and the fuel cell stack.

The fuel cell stack 150 basically includes a power-generation cell stack 185 and a hexahedral box-shaped casing 190 that accommodates the power-generation cell stack 185. The casing 190 is constructed by combining a first end plate 191 located at one end in the stack direction of the power-generation cell stack 185, a second end plate 192 located at the other end in the stack direction, and first to fourth side panels 193, 194, 195, and 196 located on four planes other than the ends. Medium supply holes 186 for supplying mediums such as oxygen-containing gas or hydrogen-containing gas to the power-generation cell stack are formed through the first end plate 191.

Interdigital grooves 188 are formed in the four edges of the first end plate 191 and interdigital grooves 189 which can be coupled to the interdigital grooves 188 in an interdigitating manner are formed in only one edge of each of the first to fourth side panels 193 to 196 connected to the edges of the first end plate 191. The first end plate 191 and the first to fourth side panels 193 to 196 are fixed to each other by coupling the interdigital grooves 188 and 189 in the interdigitating manner and then inserting shearing pins 197 (as a first fixing structure) into the interdigital grooves.

A plurality of tapping holes 145 are formed in the four edge surfaces of the second end plate 192. Bung holes 146 corresponding to the tapping holes 145 are formed in an edge of each of the first to fourth side panels 193 to 196 connected to the edges of the second end plate 192.

In the configuration described above, the second end plate 192 is strongly and non-movably fixed to the edges of the first to fourth side panels 193 to 196 with bolts 147 (as a second fixing structure). On the contrary, the interdigital grooves 188 of the first end plate 191 engage with the interdigital grooves 189 of the first to fourth side panels 193 to 196 in the interdigitating manner and they are connected with shearing pins 197. Accordingly, the first end plate 191 is fixed to the side panels 193 to 196 so as to be slightly movable in the stack direction of the power-generation cell stack 185. As a result, even when an acceleration acts on the fuel cell stack 150 in the same direction as the stack direction of the power-generation cell stack 185, the first end plate 191 can be moved in the same direction along with the power-generation cell stack 185. Accordingly, it is possible to prevent a gap from occurring between the first end plate 191 and the power-generation cell stack 185.

In the present exemplary embodiment, the medium supply holes 186 for supplying medium gas such as oxygen-containing gas and hydrogen-containing gas are provided to the first end plate 191. Accordingly, even when an acceleration acts on the fuel cell stack 150 in the stack direction of the power-generation cell stack 185, the first end plate 191 is moved in the same direction along with the power-generation cell stack 185, thereby preventing the leakage of the oxygen-containing gas or the hydrogen-containing gas.

In the above-mentioned exemplary embodiment, it has been described as the method of fixing the second end plate 192 and the side panels 193 to 196 that the tapping holes 145 are formed in the second end plate 192 and the bung holes 146 are formed in the side panels 193 to 196. However, in such a structure, when an acceleration acts on the fuel cell stack 150 in the stack direction of the power-generation cell stack 185, stress in the shearing direction occurs in the bolts 147. Accordingly, by forming the tapping holes in the side panels 193 to 196, forming the bung holes in the second end plate 192, and then matching the acceleration direction with the screw-coupling direction of the bolts 147, it is possible to prevent stress in the shearing direction from occurring in the bolts 147.

Third Exemplary Embodiment

Hereinafter, a fuel cell vehicle according to an exemplary embodiment of the present invention will be described with reference to FIGS. 14 to 21.

Figure 14:
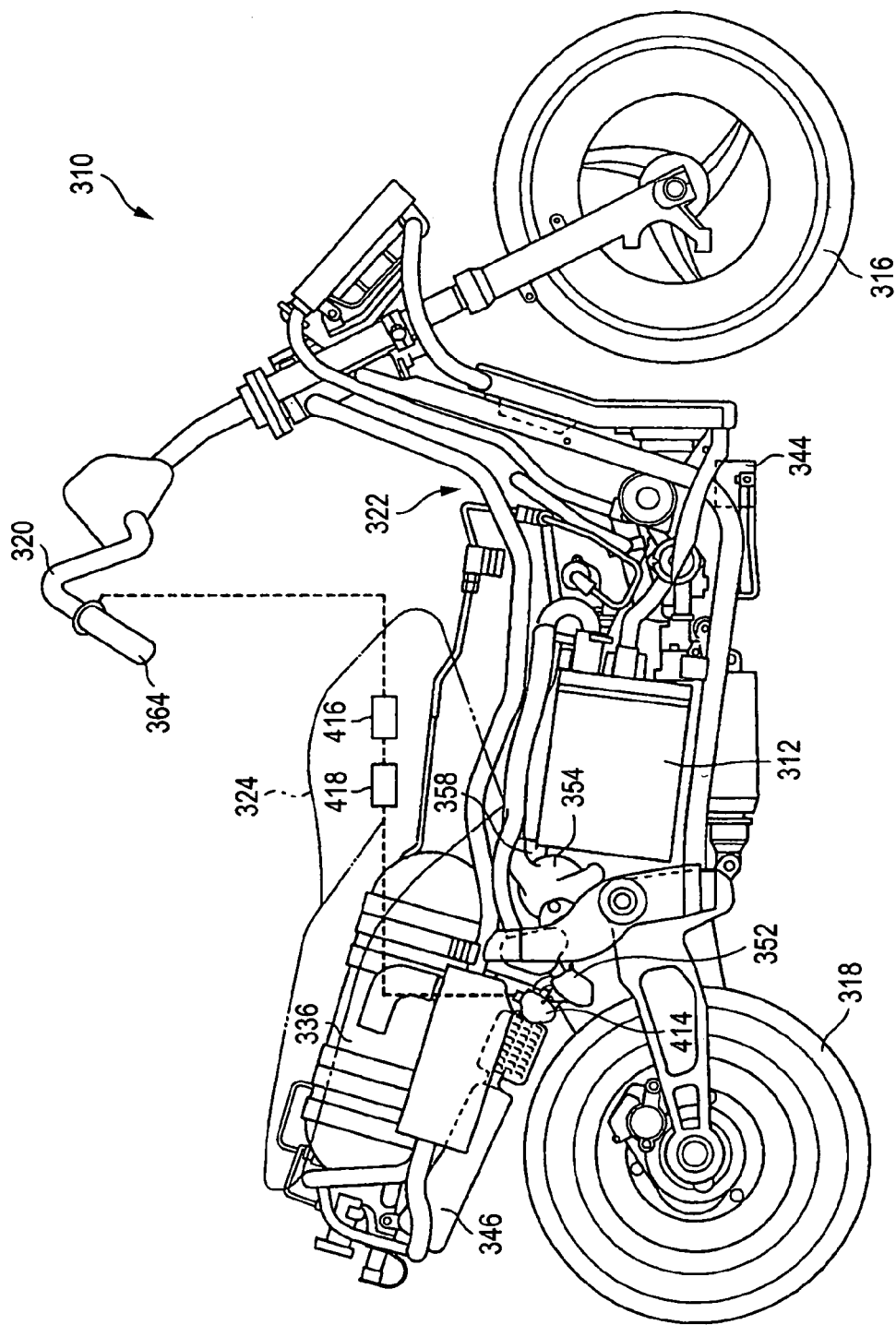
FIG. 14 is a side view illustrating a fuel cell motorcycle according to an exemplary embodiment of the present invention.

As shown in FIG. 14, a fuel cell motorcycle 310 as the fuel cell vehicle according to the present exemplary embodiment has a fuel cell 312 mounted thereon and thus travels by driving a motor 314 by the use of power obtained from the fuel cell 312. The fuel cell 312 is a polymer electrolyte membrane fuel cell (PEMFC) in which a plurality of unit cells is stacked and generates electric power by reacting a reactant gas (air) supplied to a cathode with a fuel gas (hydrogen gas) supplied to an anode. The fuel cell motorcycle 310 includes a front wheel 316 as a steering wheel, a rear wheel 308 as a driving wheel, a handle 320 for steering the front wheel 316, a frame 322, and a seat 324 for allowing a driver and a passenger to sit.

Figure 15:
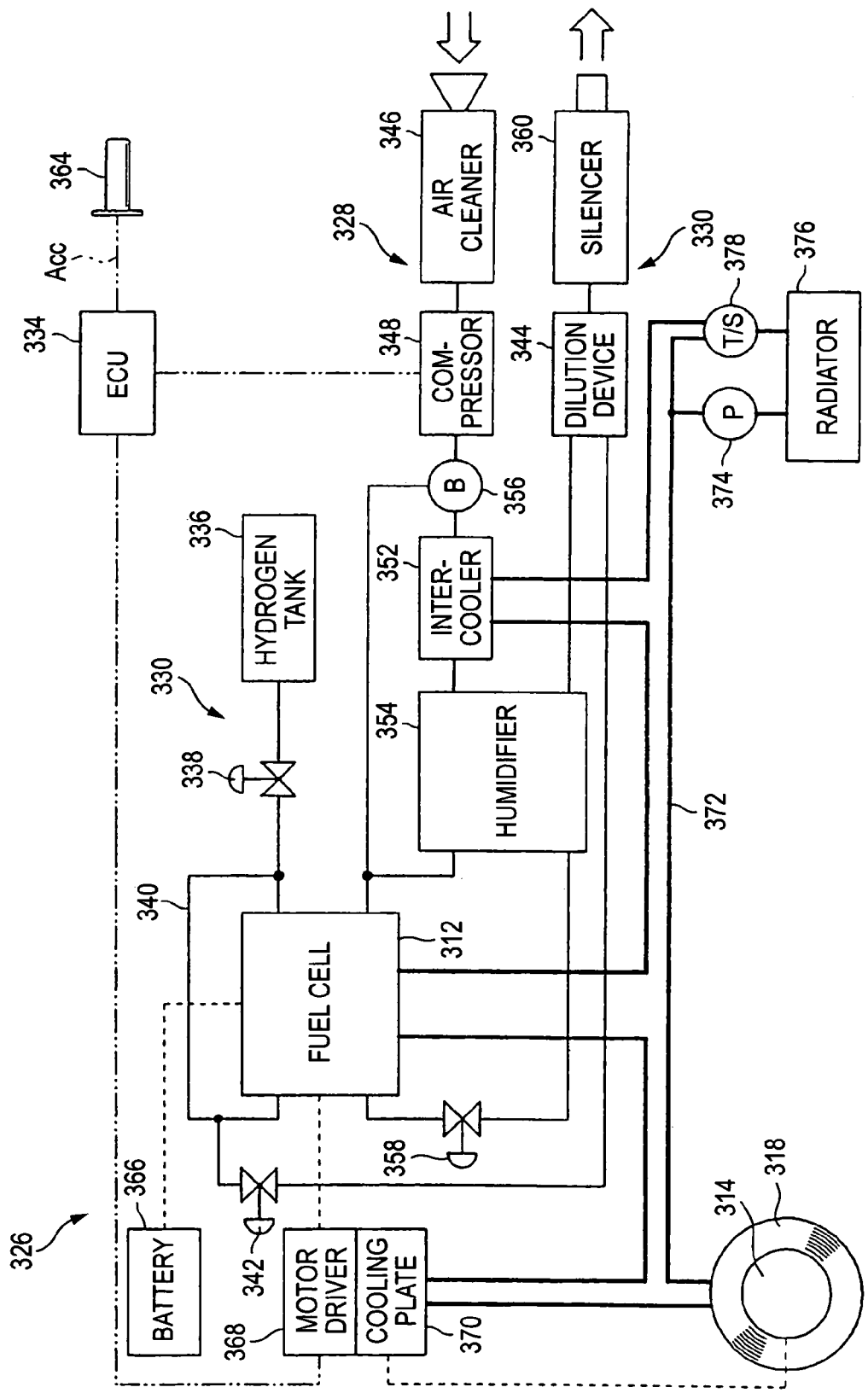
FIG. 15 is a block diagram illustrating a fuel cell system in the fuel cell motorcycle.

A fuel cell system 326 of the fuel cell motorcycle 310, as shown in FIG. 15, includes reactant gas supply means 328 for supplying the reactant gas to the fuel cell 312, hydrogen gas supply means 330 for supplying the hydrogen gas to the fuel cell 312, exhaust means 332 for exhausting an exhaust gas generated through the reaction in the fuel cell 312, and an ECU (Electric Control Unit) 334 for totally controlling the running of the system. The exhaust means 332 is provided with a back-pressure valve 358 for adjusting the pressure of the exhaust gas.

The hydrogen gas as a fuel gas is supplied to the fuel cell 312 through a blocking valve 338 from a hydrogen tank 336 and then is guided to a hydrogen circulating passage 340 after being used for power generation. In the hydrogen circulating passage 340, the remaining (non-reacted) hydrogen gas joins the hydrogen gas guided from the hydrogen tank 336 and then is supplied to the fuel cell 312 again. The hydrogen gas circulating through the hydrogen circulating passage 340 is guided to a dilution device 344 through a purge valve 342.

On the other hand, air as a reactant gas is guided to a compressor 348 through an air cleaner 346, is supplied to the fuel cell 312 in a compressed status with a predetermined pressure, and is then guided to the dilution device 344 after being used for power generation. An intercooler 352 cools the air supplied to the fuel cell 312 and a humidifier 354 supplies moisture to the reactant gas. A bypass valve 356 allows the air to flow without passing through the intercooler 352 and the humidifier 354 when the fuel cell 312 is at a low temperature or the like. The back-pressure valve 358 adjusts the pressure of the reactant gas in the fuel cell 312. The configuration and operation of the back-pressure valve 358 will be described later.

By allowing the purge valve 342 disposed in the hydrogen circulating passage 340 to be opened, the hydrogen gas after reaction is guided into the dilution device 344, is mixed and diluted with the exhaust gas from the fuel cell 312 by the dilution device 344, and then is exhausted to the air through a silencer 360. Here, water generated from the fuel cell 312 is collected when it is guided into the humidifier 354 along with the exhaust gas and is reused as moisture supplied to the reactant gas. The moisture (for example, steam) not collected in the humidifier 354 is exhausted through the dilution device 344 along with the gases after reaction.

Specifically, the ECU 334 receives signals relating to the pressure and the temperature of the hydrogen gas and the reactant gas, signals relating to a vehicle speed and the number of rotation of the compressor 348, and signals relating to the temperature of the fuel cell 312 and a cooling water thereof and controls operations of the compressor 348, the bypass valve 356, the back-pressure valve 358, the purge valve 342, and the blocking valve 338 in response to the received signals.

In addition, the ECU 334 receives an acceleration request signal from a throttle grip 364 and controls the driving of the motor 314 for driving the rear wheel 318 in response to the signal. The motor 314 is embodied as a three-phase AC motor in which DC current from the fuel cell 312 or a battery 366 as a secondary cell is converted into three-phase AC current by a motor driver (controller) 368 as an inverter unit and then is supplied for drive.

A cooling system in a fuel cell system forms a cooling water passage 372 for connecting water passages in water jackets of the fuel cell 312 and the motor 314, in the intercooler 352, and in a cooling plate (cooler) adjacent to the motor driver 368, and the cooling water passage 372 is provided with a water pump 374 and a radiator 376.

In such a cooling system, by allowing the cooling water to flow and circulate through the cooling water passage 372 by means of the operation of the water pump 374, the cooling water absorbs heat from the fuel cell 312, the motor 314, the reactant gas, and the motor driver 368, and the absorbed heat is released through the radiator 376. A thermostat 378 allows the cooling water to circulate without passing through the radiator 376 when the fuel cell 312 is at the low temperature.

Next, the back-pressure valve 358 provided in the exhaust means 332 of the fuel cell motorcycle 310 and a valve opening ratio controller 400 for controlling the back-pressure valve 358 will be described.

Figure 16:
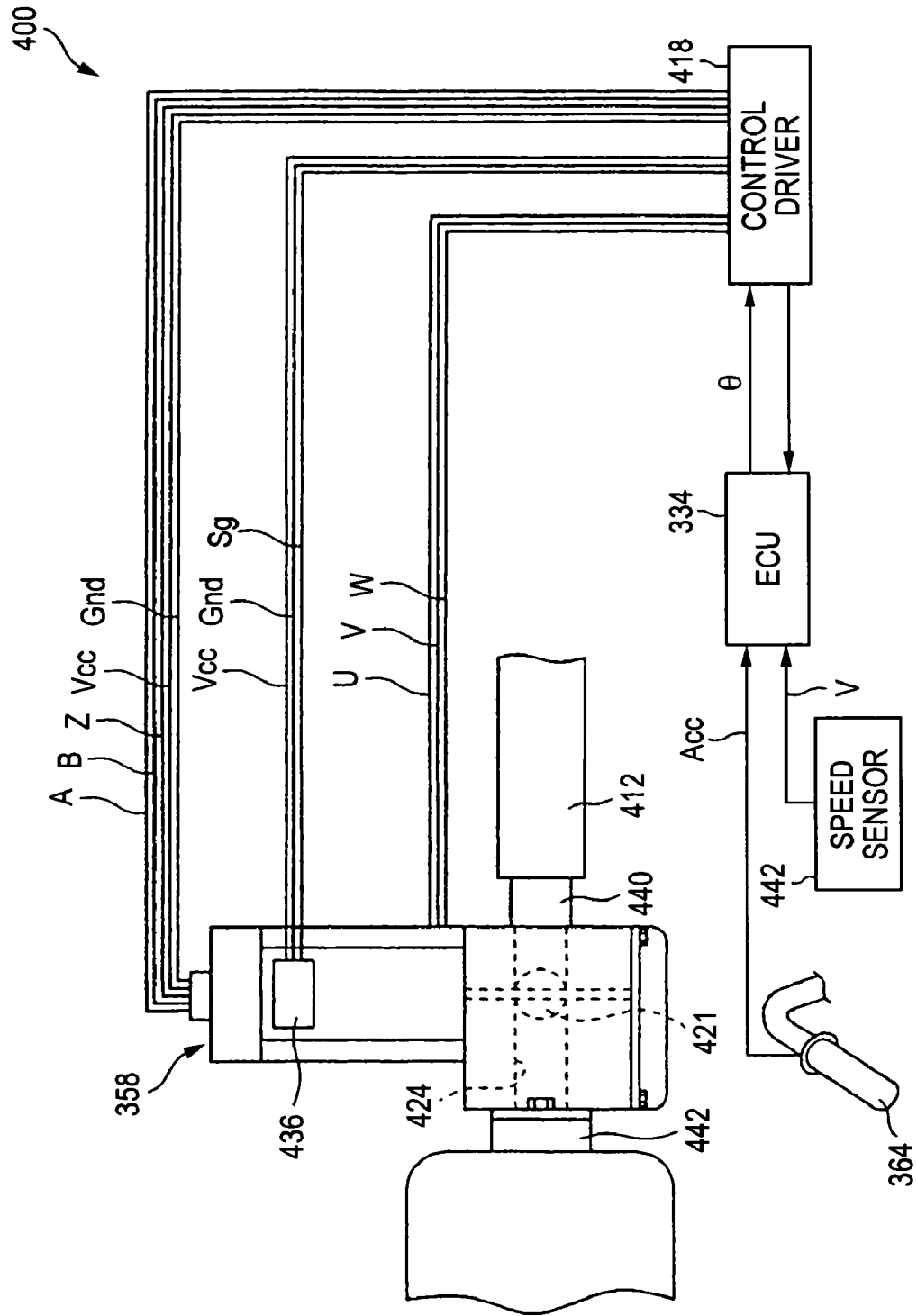
FIG. 16 is a block diagram illustrating a schematic configuration of a valve opening ratio controller.

As shown in FIG. 16, the valve opening ratio controller 400 includes the back-pressure valve 358 provided in an intermediate portion of the air suction passage 412 and a controller driver 418 for controlling the back-pressure valve 358 on the basis of a target throttle opening ratio θa instructed by the ECU 334. The ECU 334 determines the amount of power generation in the fuel cell 312 on the basis of the amount of manipulation Acc of the throttle grip 364, the rest capacity of the battery 366, and the vehicle speed signal V and calculates and supplies a target throttle opening ratio θa to the control driver 418 at the same time as controlling the rotation of the compressor 348 on the basis of the determined amount of power generation. Operation instruction information and error information in addition to the target throttle opening ratio θa are transmitted between the ECU 334 and the control driver 418 through communicating with each other. A predetermined intra-vehicle network through which they can communicate with other controllers may be used for transmitting the vehicle speed signal V, and the target throttle opening ratio θa.

Figure 17:
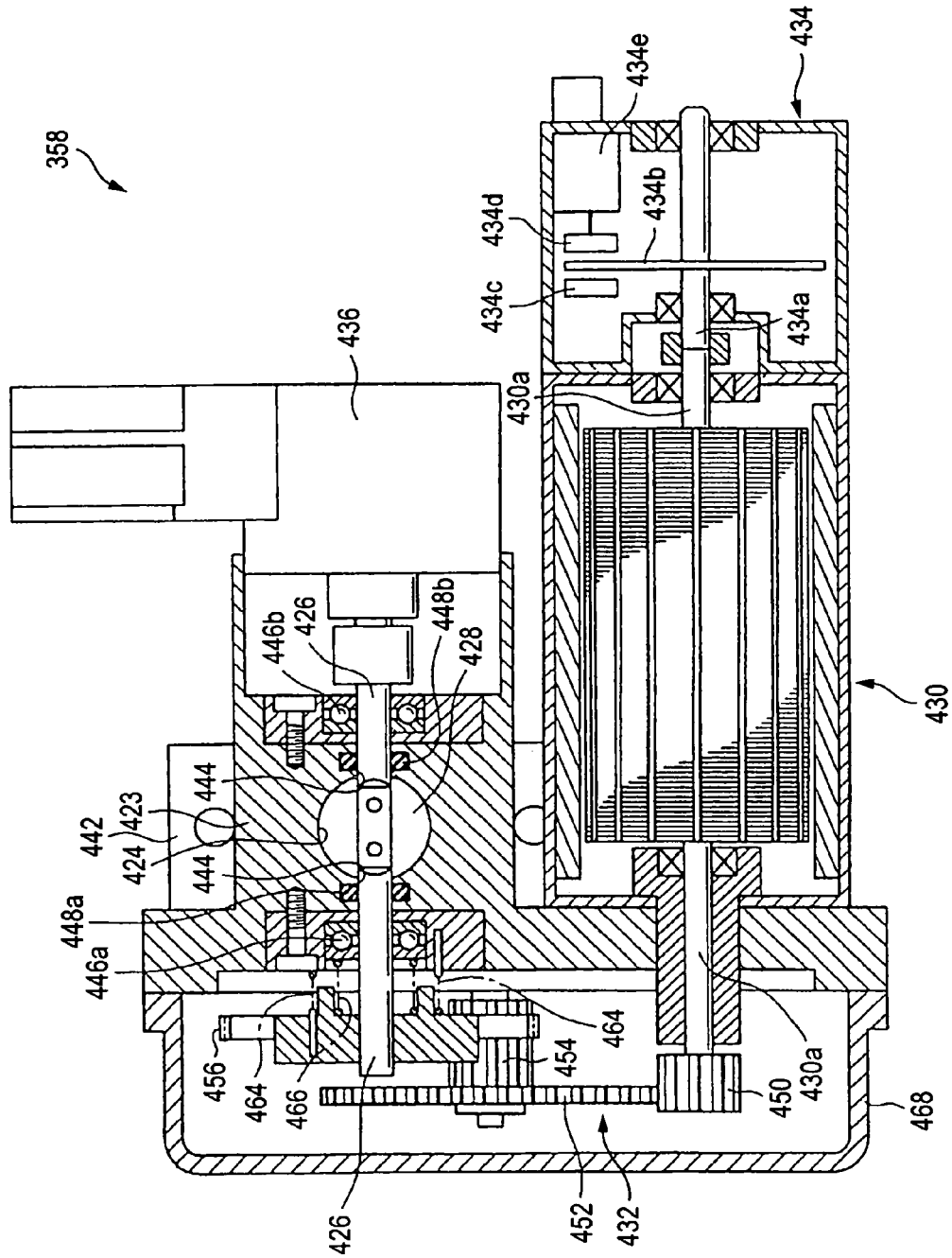
FIG. 17 is a front sectional view illustrating a throttle valve.
Figure 18:
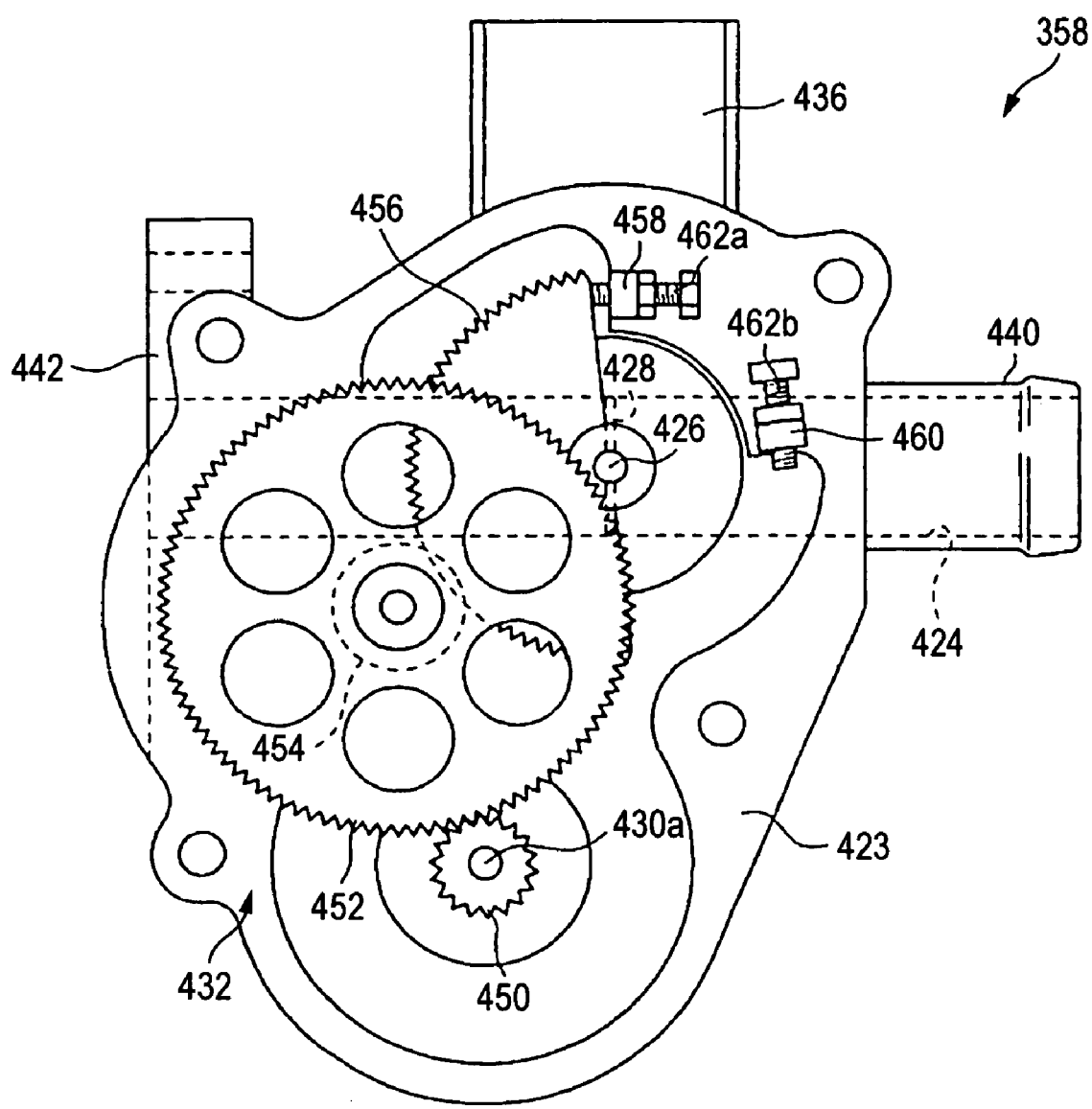
FIG. 18 is a side view illustrating the throttle valve.
Figure 19:
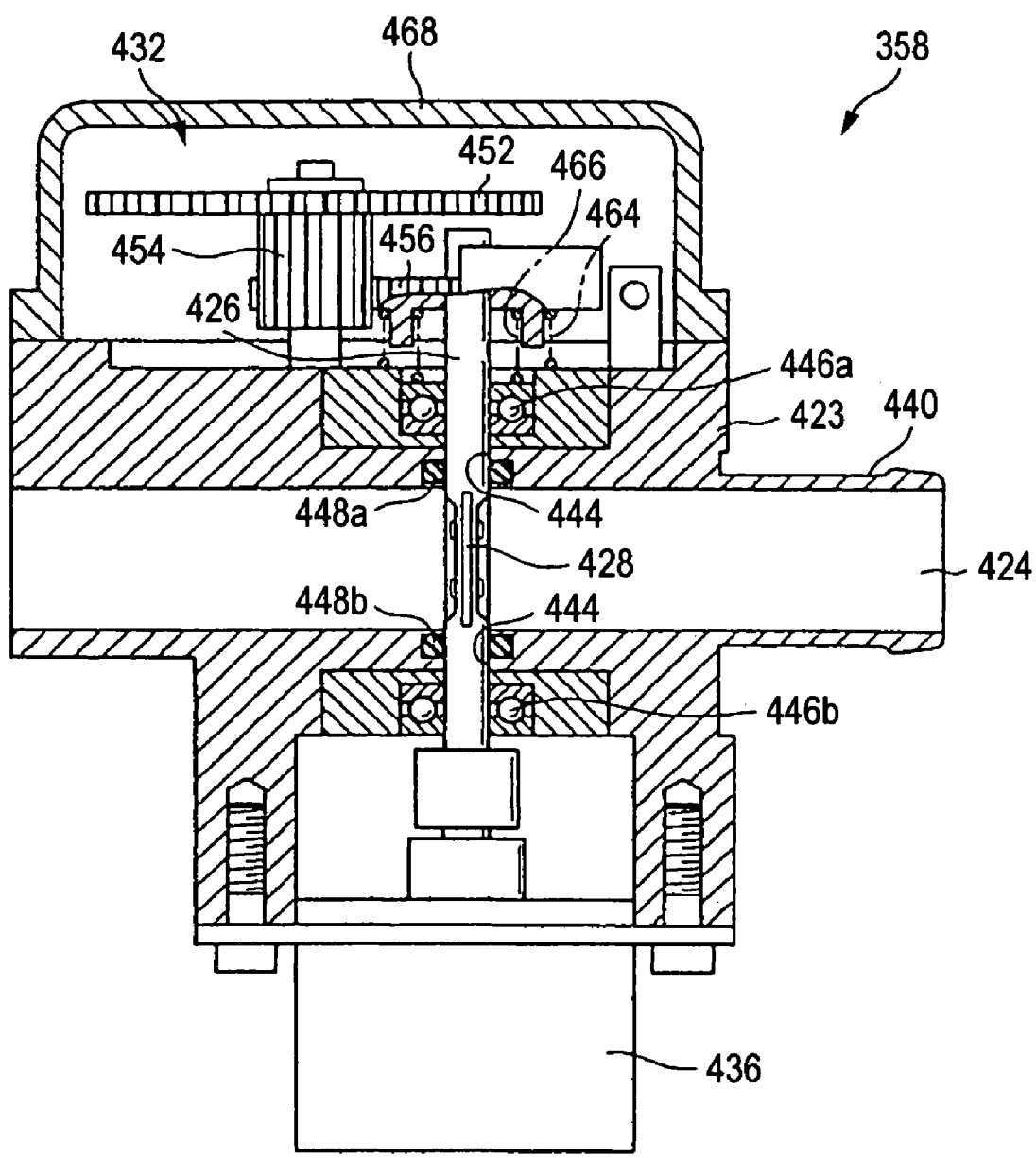
FIG. 19 is a top sectional view illustrating the throttle valve.
Figure 20:
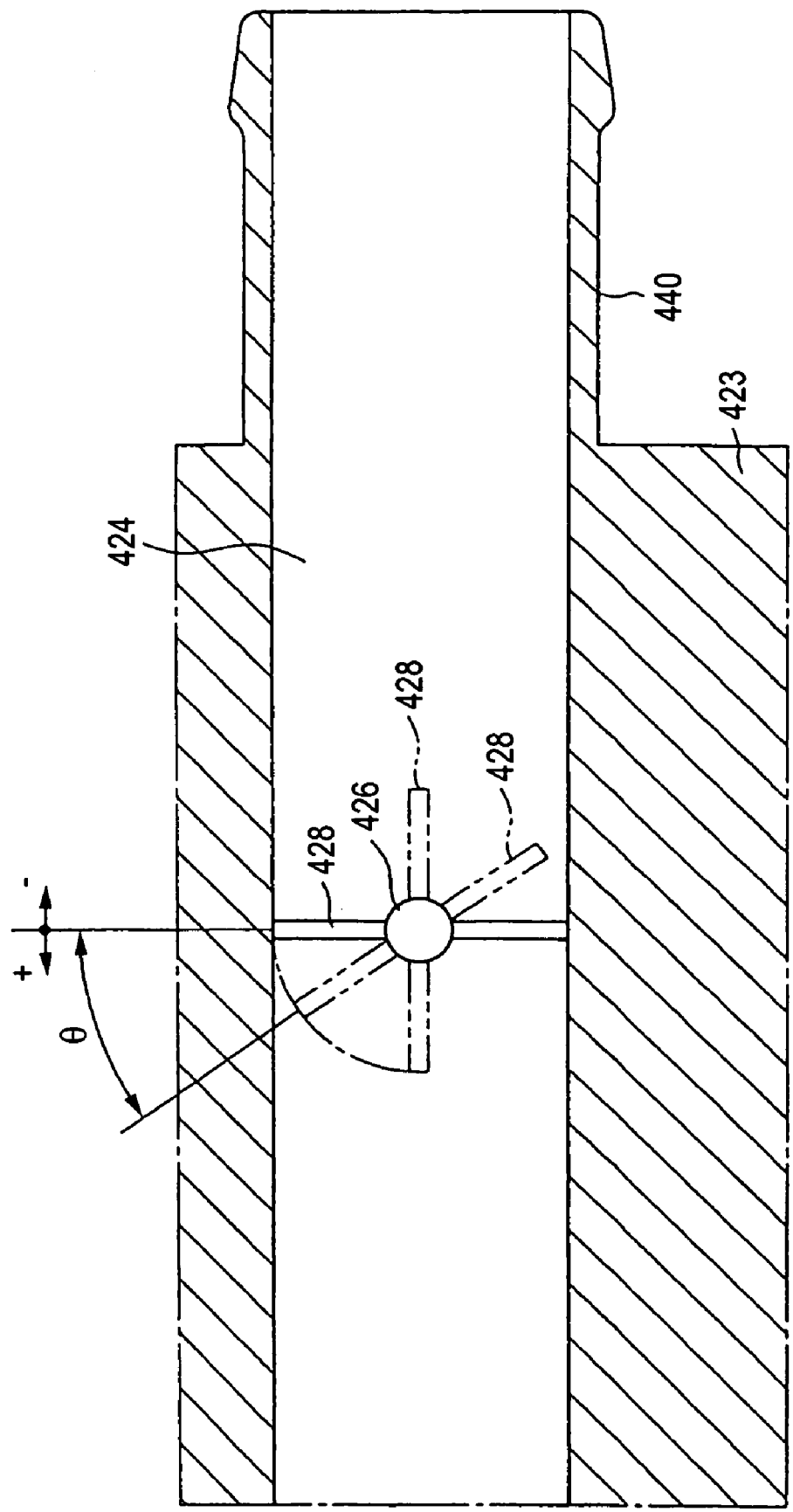
FIG. 20 is a schematic view illustrating an operation of a butterfly valve in a flow passage.

As shown in FIGS. 17 to 19, the back-pressure valve 358 basically includes a body 413 and further includes a flow passage 424 having a circular section and passing through the body 423, a disc-shaped butterfly valve 428 as a valve body connected to a valve axis 426 so as to open and close the flow passage 424, a brushless motor 430 as a rotational drive source of the butterfly valve 428, and a deceleration mechanism 432 having a plurality of gears for decelerating the rotation of an output axis 430a of the brushless motor 430 and delivering the decelerated rotation to the valve axis 426. A rotary encoder 434 for outputting a pulse signal indicating the amount of rotation is connected to the output axis 430a, and a potentiometer 436 for detecting the amount of rotation is connected to the valve axis 426. The brushless motor 430 is of an AC three-phase drive type of U, V, and W phases and is pulse-like driven under the control of the control driver 418 (see FIG. 16). The potentiometer 436 and the control driver 418 are connected to power supply lines Vcc and Gnd and three signal supply lines Sg (see FIG. 16).

The body 423 includes a pipe 440 for connecting one end of the flow passage 424 to the air suction passage 412 and a block member 442 for connecting the other end of the flow passage 424 to a predetermined flow supply device (for example, the compressor 348) by means of bolt coupling. The valve axis 426 is connected to a circular butterfly valve 428 disposed in the flow passage 424 and is rotatably inserted into axial support holes 444 perpendicular to the flow passage 424. The rotation of the valve axis 426 tilts the butterfly valve 428 and thus the opening ratio of the flow passage 424 is adjusted depending upon the tilting angle θ. The flow passage 424 is completely closed when the tilting angle θ of the butterfly valve 428 is 0° and is completely opened when it is 90° (see FIG. 20).

Both sides of the valve axis 426 with the body 423 therebetween are supported by thrust bearings 446*a* and 446*b* and thus can rotate smoothly. O-rings 448*a* and 448*b* coming in contact with the valve axis 426 are provided in the axial support holes 444 at both sides with the flow passage 424 therebetween, thereby preventing the leakage of fluid passing through the flow passage 424 and also preventing particles from externally invading the flow passage 424.

The deceleration mechanism 432 includes a first-stage gear 450 having a small number of saw-teeth connected to the output axis 430*a* of the brushless motor 430, a first intermediate gear 452 having a large number of saw-teeth engaging with the first-stage gear 450, a second intermediate gear 454 having a small number of saw-teeth rotating coaxially with the first intermediate gear 452, and a final-stage gear 456 having a large number of saw-teeth engaging with the second intermediate gear 454. The final-stage gear 456 is connected to an end of the valve axis 426, whereby the rotation of the brushless motor 430 is decelerated by the deceleration mechanism 432 and the decelerated rotation is delivered to the valve axis 426. The potentiometer 436 is connected to the other end of the valve axis 426.

The final-stage gear 456 has a sector shape of about 180° sufficient to keep the tilting angle θ of the butterfly valve 428 in the angle range of 0°≦θ≦90° (see FIG. 18). The body 423 is provided with a first stopper 458 and a second stopper 460 for preventing the final-stage gear 456 from rotating excessively in the clockwise and the counterclockwise directions. The first stopper 458 and the second stopper 460 are provided with adjustment bolts 462*a* and 462*b* of which the protrusion amount can be adjusted and further rotation is prevented by allowing the circumferential end surface of the sector shape of the final-stage gear 456 to come in contact with the ends of the adjustment bolts 462*a* and 462*b*. The mechanical operation angle range of the tilting angle θ is adjusted by the adjustment bolts 462*a* and 462*b* to be −2°≦θ≦92° in consideration of an operation margin.

On the other hand, the target throttle opening ratio θa provided from the ECU 334 is in the angle range of 0°≦θa≦90°. At the time of normal operation, a state that the final-stage gear 456 strongly presses the first stopper 458 or the second stopper 460, that is, a contact state, can be prevented from occurring, thereby preventing overcurrent to the brushless motor 430 resulting from deviation between the target throttle opening ratio θa and the tilting angle θ.

A return spring 464 is disposed around the valve axis 426 between the body 423 and the final-stage gear 456 and serves to bias the final-stage gear 456 in the clockwise direction in FIG. 18. Accordingly, when the brushless motor 430 is not supplied with power, the final-stage gear 456 comes in contact with the adjustment bolt 462*a* (in the state shown in FIG. 18) and the tilting angle θ is kept at the position of θ=2°. The return spring 464 serves as reinforcing means for reinforcing the engagement between the gears and applies a preliminary pressure to the deceleration mechanism 432, thereby preventing the sliding between the gears to enhance the precision of the opening ratio of the valve. For example, a torsion spring is used as the return spring 464.

A coil spring 466 is additionally provided around the valve axis 426 and applies a biasing force as a previous pressure to the end surface of the thrust bearing 446*a*, thereby preventing the looseness. In addition, the deceleration mechanism 432, the return spring 464, and the coil spring 466 are covered with a cover 468 for protecting them from dust or the like, but the cover 468 is detached so as to view the deceleration mechanism in the side view shown in FIG. 18.

As shown in FIG. 17, the first-stage gear 450 is disposed at one end of the output axis 430*a* of the brushless motor 430 and the rotary encoder 434 is connected to the other end thereof.

The rotary encoder 434 is of a so-called incremental type and includes a detection axis 434*a* connected to the output axis 430*a* of the brushless motor 430, a disk 434*b* disposed on the detection axis 434*a*, a plurality of light emitting elements 434*c* and a plurality of light receiving elements 434*d* disposed at positions opposed to each other with the disk 434*b* therebetween, and an amplifier 434*e* for adjusting the detection signal from the light receiving elements 434*d*. A plurality of slits are disposed in the disk 434*b* to correspond to the rotation angle and the light receiving elements 434*d* supply the detection signal received through the slits to the amplifier 434*e*. The rotary encoder 434 outputs an A-phase signal which is a pulse signal corresponding to the rotation angle, a B-phase signal having a phase different by an angle of 90° from the A-phase signal, and a Z signal indicating a predetermined reference angle and supplies the output signals to the control driver 418. The control driver 418 supplies power to the rotary encoder 434 through the power supply lines Vcc and Gnd (see FIG. 16).

Figure 21:
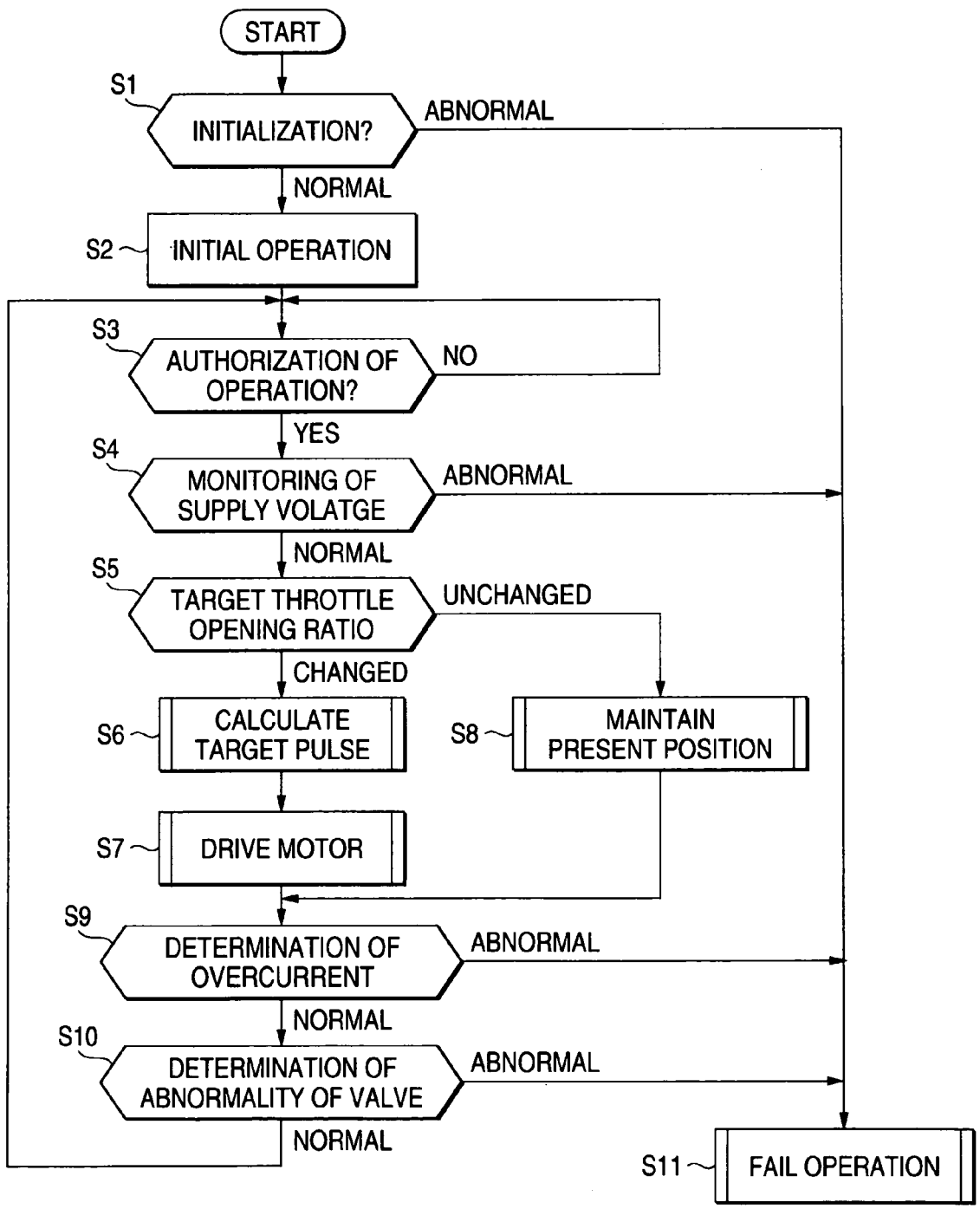
FIG. 21 is a flowchart illustrating an operation of the valve opening ratio controller.
Figure 22:
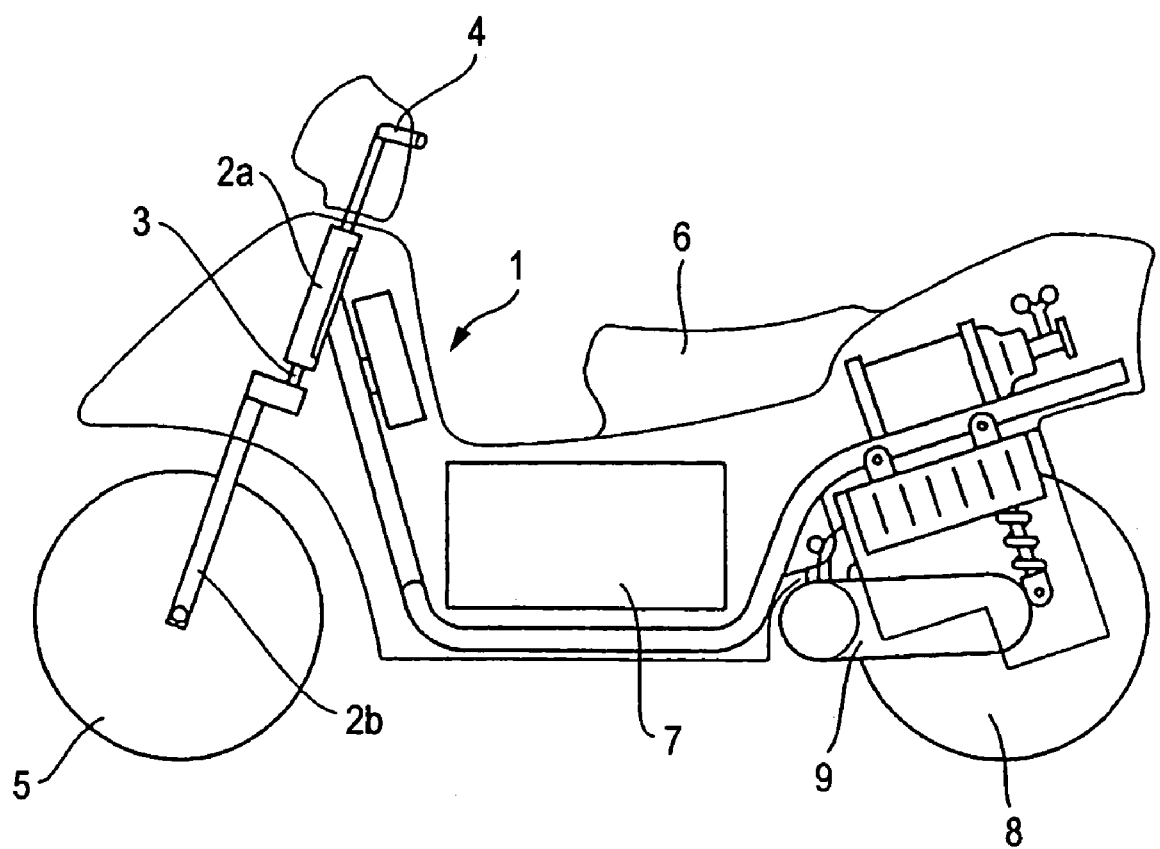
FIG. 22 is a schematic side view illustrating a motorcycle of a related art.
Figure 23:
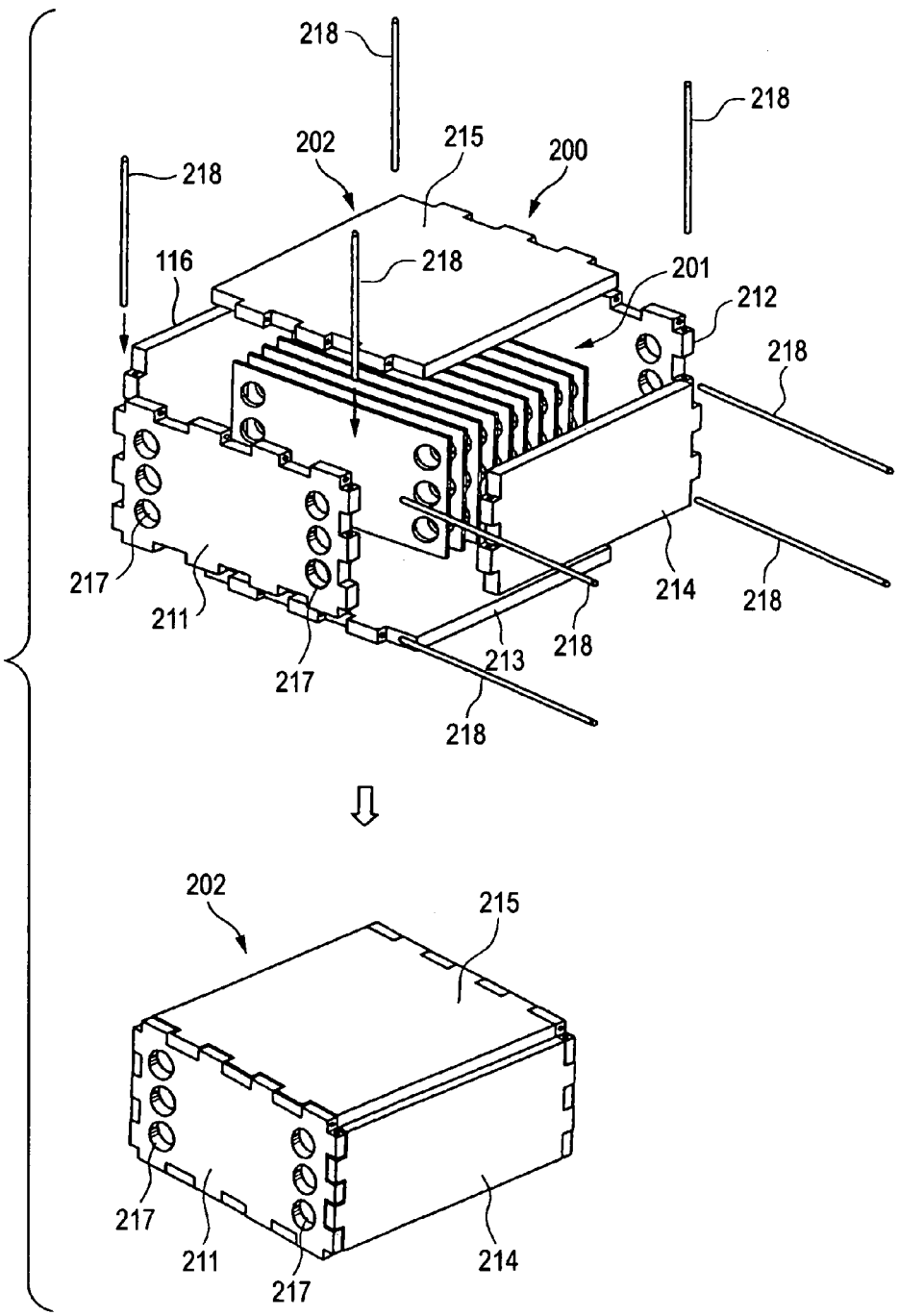
FIG. 23 is an assembly diagram illustrating a first structural example of a related fuel cell stack.
Figure 24:
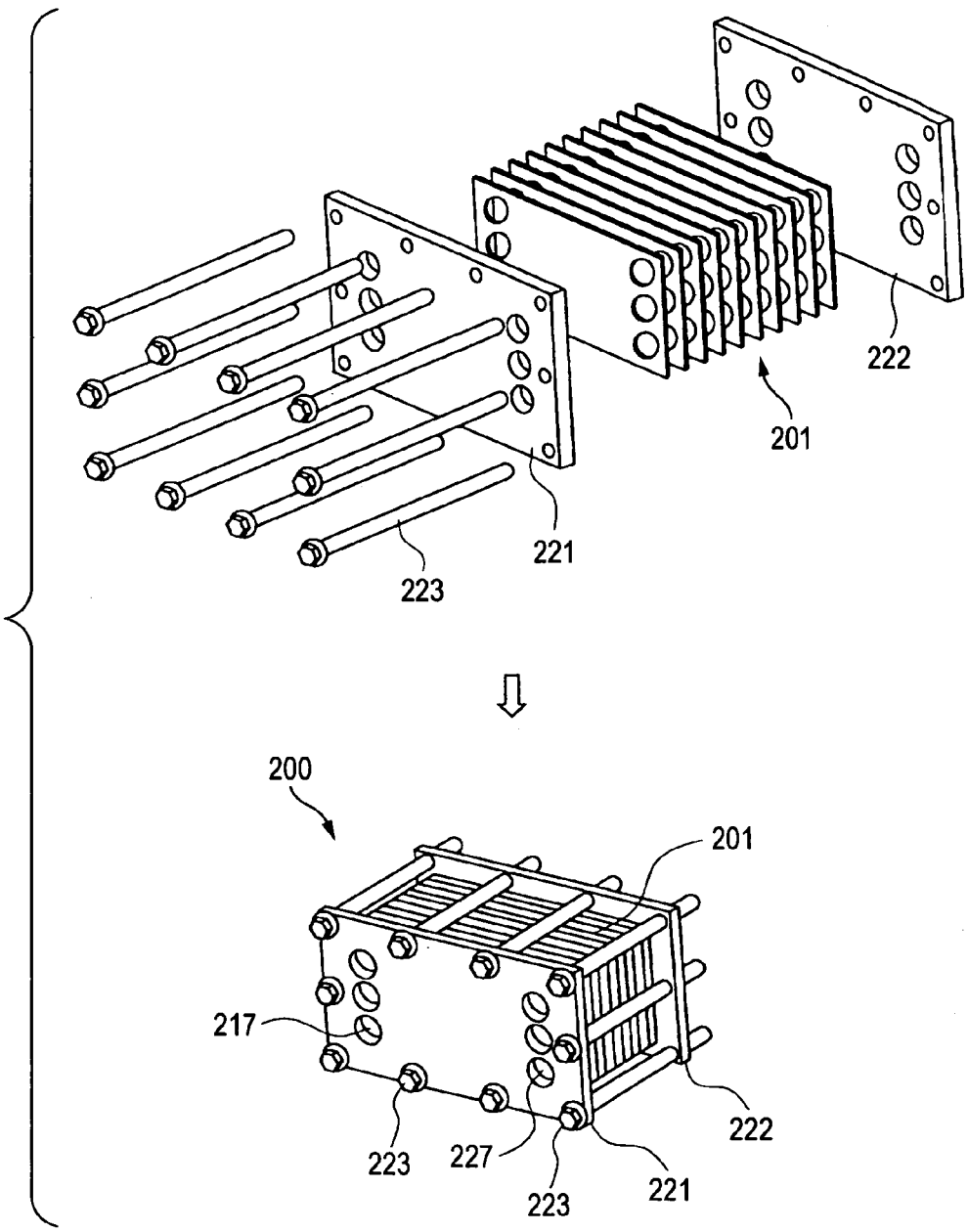
FIG. 24 is an assembly diagram illustrating a second structural example of a related fuel cell stack.
Figure 25:
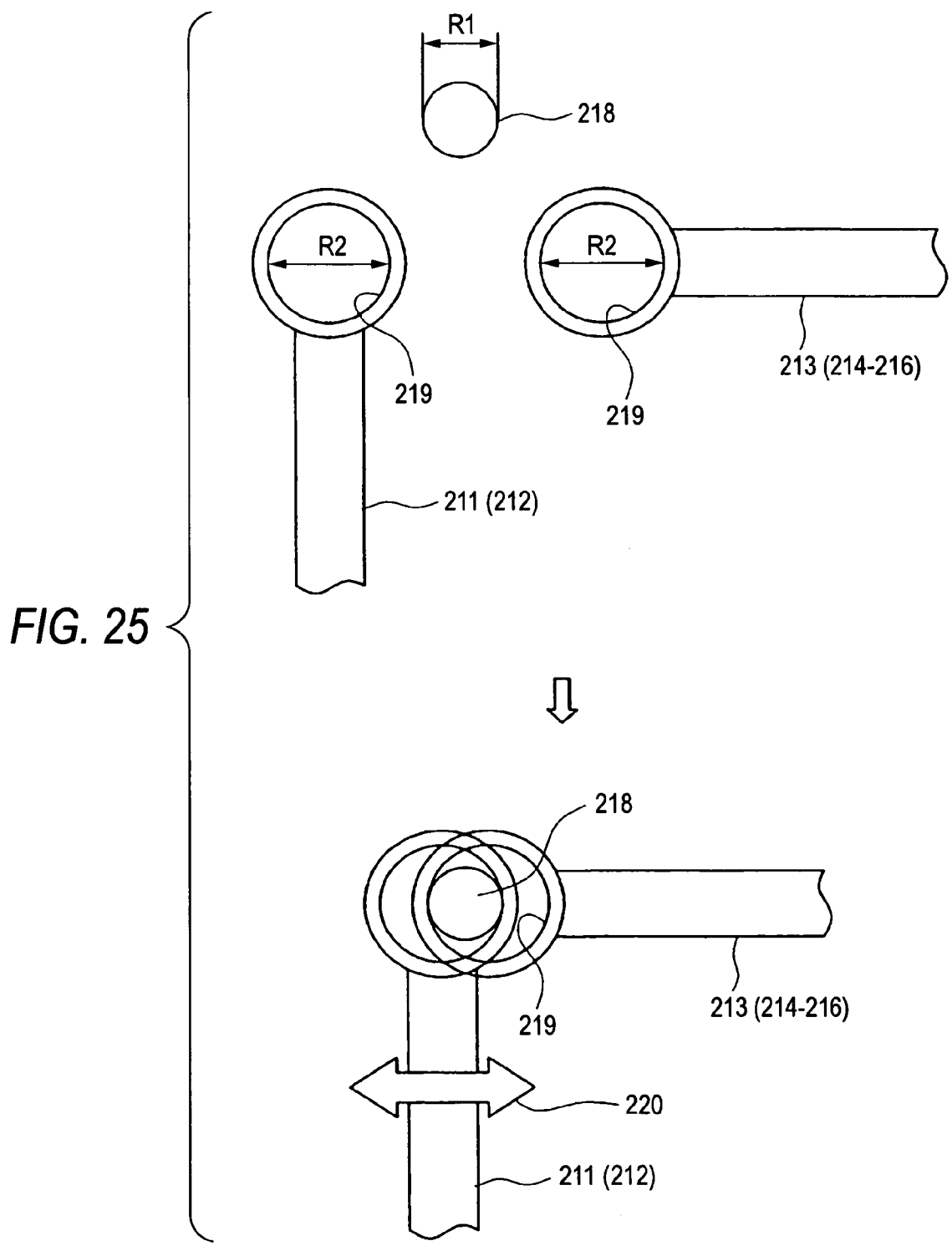
FIG. 25 is a schematic diagram illustrating a problem of the first structural example of the related fuel cell stack.

Next, the operation of the valve opening ratio controller 400 having the above-mentioned configuration will be described with reference to FIG. 21. The operation shown in FIG. 21 is started by supplying power to the control driver 418 in response to a driver's manipulation turning an ignition key (not shown) to an ON position. Specifically, the operation is performed as a software process by allowing an internal CPU (Central Processing Unit) to read and execute a program from a predetermined memory.

First, in step S1, a predetermined initialization process is performed. That is, no abnormality such as disconnection of wires is checked based on the signal Sg relating to an angle obtained from the potentiometer 136 and predetermined failure inspection is performed. When the abnormality such as disconnection of wires is checked through the failure inspection, it is notified to the ECU 334 and step S11 which is a predetermined failure handling process is performed. When no abnormality is checked, step S2 is carried out.

In step S1, since the final-stage gear 456 is biased by the return spring 464, it is checked that the tilting angle θ of the valve axis 426 has a value near −2° on the basis of the signal Sg from the assumption of θ=−2°.

In addition, at this time, the value of an updown counter Cn for measuring the rotation angle of the output axis 430*a* is reset to 0. Thereafter, in a specific parallel process (or an interrupt process or the like) not shown, the updown counter Cn increases or decreases in real time in accordance with the pulses of the A-phase signal and the B-phase signal obtained from the rotary encoder 434.

In step S2, as the initial operation, the brushless motor 430 is driven in response to an operation start instruction received from the ECU 434. The brushless motor 430 is allowed to rotate until the tilting angle θ is 0° and the Z signal is received from the rotary encoder 434 and then the brushless motor 430 is temporarily stopped at the time of receiving the Z signal, thereby performing a predetermined positioning process.

At the time of receiving the Z signal, a substitution process of Cz→Cn is performed to set a position correction parameter Cz. Thereafter, by subtracting the position correcting parameter Cz from the updown counter Cn, it is possible to detect an accurate angle with respect to the position of which the tilting angle θ is 0°. That is, the tilting angle θ is expressed as θ=Cn−Cz.

In step S3, it is checked whether an operation enable signal from the ECU 434 is valid at that time. When the operation enable signal is invalid, the operation is in a standby state and when the operation enable signal is valid, step S4 is performed.

In step S4, a value of a source voltage supplied from a predetermined power supply circuit is checked. When the value of the source voltage is in a predetermined range, step S5 is performed and when the value of the source voltage is not in the predetermined range, the failure handling process of step S11 is performed. That is, when the source voltage is too large, the brushless motor 430 may be damaged and when the source voltage is too small, the desired rotation torque may not be obtained. Accordingly, by performing a source voltage monitoring process in step S4, such a situation is prevented from occurring.

In step S5, the value of the target throttle opening ratio θa provided from the ECU 434 is checked and is compared with the previous value. Then, a branching process based on the comparison result is performed. That is, when the target throttle opening ratio θa is not varied, a present position keeping process of step S8 is performed and when it is varied, step S6 is performed.

In step S6, the number of output pulses Po for driving the brushless motor 430 in a pulse manner is calculated by the use of the following expression.

$$Po \rightarrow (\theta a/360) \cdot R \cdot Pe - (Cn - Cz) \quad \text{(Expression 1)}$$

Here, R denotes a deceleration ratio of the deceleration mechanism 432 and Pe denotes the number of pulses per rotation output from the rotary encoder 434, which are all fixed values. In the first term of the right side of Expression 1, the target throttle opening ratio θa supplied in a unit of 0° to 90° is divided by 360° and then is multiplied by the deceleration ratio R and the number of pulses Pe, whereby the unit is converted into R×Pe per rotation. The target throttle opening ratio θa expressed as a rotation angle of the valve axis 426 can be expressed as a rotation angle of the output axis 430a of the brushless motor 430. Supposed that R=20 and Pe=500, the target throttle opening ratio θa of 0° to 90° is expressed by 0 to 2500 in the number of output pulses Po.

By subtracting the second term in the right side of Expression 1 from the value (the first term in the right side of Expression 1), the number of output pulses Po is obtained as the number of pulses into which the angular deviation at that time is converted. The second term in the right side of Expression 1 is a value obtained by subtracting the position correcting parameter Cz from the updown counter Cn and the value means the rotation angle of the output axis 430a about the position that the tilting angle θ satisfies θ=0°.

As can be seen clearly from Expression 1, the unit of the number of output pulses Po may be set to a sufficiently small value such as 0.036°(=90/2500). In other words, when the valve axis 426 rotates in a quarter rotation (0° to 90°), the output axis 430a is accelerated to rotate in 5 rotations, thereby obtaining the precision of measurement corresponding to the number of pulses (=2500) five times as many as the number of output pulses Po (=500) per rotation of the rotary encoder 434.

In step S7, the brushless motor 430 is driven in a pulse manner on the basis of the number of output pulses Po obtained in step S6. Accordingly, the valve axis 426 rotates with the rotation of the output axis 430a and the tilting angle θ of the valve axis 426 becomes equal to the target throttle opening ratio θa. In this case, since the output torque of the brushless motor 430 increases in proportion to the deceleration ratio R and is delivered to the valve axis 426, the valve axis 426 can satisfactorily operate against a fluid force or a frictional force.

The number of output pulses Po is output as a value obtained by converting the angular deviation at that time into the number of pulses and thus a kind of feedback control is performed.

In step S9 subsequent to step S7 or step S8, a overcurrent determination process is carried out to the brushless motor 430. When it is determined that overcurrent occurs, the failure handling process of step S11 is performed and when the current value is in the normal range, step S10 is performed.

In step S10, the abnormality of the back-pressure valve 358 is variously checked. When the back-pressure valve is normal, step S3 is performed again to continue to control the brushless motor 430 and when the back-pressure valve is abnormal, the failure handling process of step S11 is performed. An example of the abnormality check performed in step S10 can include checking whether the signal Sg of the potentiometer 436 normally follows the driving of the brushless motor 430. When the signal Sg does not follow the driving of the brushless motor, it indicates that the deceleration mechanism 432 and the like have a problem and thus step S11 is performed.

In addition, the operation shown in FIG. 21 is executed repeatedly for a very short time. Accordingly, when abnormality occurs, the back-pressure valve 358 can be protected properly by performing the failure handling process of S11 through the abnormality check in steps S1, S4, S9, and S10. The process of step S11 is prepared for coping with unpredicted situations and such abnormality is generally set not to occur.

As described above, in the fuel cell motorcycle 310 relating to the present embodiment, the exhaust means 332 is provided with the back-pressure valve 358 for adjusting the pressure of the exhaust gas and is controlled by the valve opening ratio controller 400. Since the air supplied to the back-pressure valve 358 is compressed by the compressor 348 and the supply pipe thereof has a relatively small diameter, it is necessary to adjust the tilting angle θ with high precision so as to keep the amount of air passing through the back-pressure valve proper.

In the valve opening ratio controller 400, since the amount of rotation of the output axis 430a of the brushless motor 430 and the tilting angle θ of the valve axis 426 are obtained on the basis of the A-phase signal, the B-phase signal, and the Z signal which are pulse signals output from the rotary encoder 434, the influence of electrical noise can be reduced. Accordingly, it is possible to control the opening ratio of the flow passage 424 with high precision by preventing slight vibration of the butterfly valve 428. As a result, the internal pressure of the fuel cell 312 can be accurately controlled, thereby stabilizing the amount of power generation. The stabilization of the amount of power generation improves, for example, the traveling performance of the fuel cell motorcycle 310.

Since the rotary encoder 434 has an excellent linearity and an excellent temperature characteristic in comparison with an analog sensor, the rotary encoder can accomplish desired precision with relatively low cost. The valve opening ratio controller 400 combines with the analog potentiometer 436. However, since the potentiometer 436 is basically designed to cope with unpredicted situations such as detection of abnormality of the deceleration mechanism 432, the potentiometer 436 may be omitted at the time of design. That is, in the valve opening ratio controller 400, the back-pressure valve 358 can be controlled by the use of only the rotary encoder 434 for detecting the rotation and thus it can be constructed with low cost. Since a rotary encoder for controlling rotation is provided in most brushless motors, the rotary encoder may be commonly used for detecting the tilting angle θ of the valve axis 426.

Since the deceleration mechanism 432 is disposed between the brushless motor 430 and the valve axis 426, the rotation of the valve axis 426 is accelerated and delivered to the rotary encoder 434, thereby substantially enhancing the resolution in detection of rotation of the tilting angle θ. Even when a noise is added to the output signal of the rotary encoder 434, the influence of the noise can be reduced at the deceleration ratio R of the deceleration mechanism 432, thereby suppressing the vibration generated by the butterfly valve 428.

In addition, a variety of motors can be used as the actuator, as well as the brushless motor 430. A hole IC or a resolver may be used as the rotation detection sensor, as well as the rotary encoder 434. In these cases, the same advantages can be obtained.

In the valve opening ratio controller 400 of the fuel cell motorcycle 310, since the rotary encoder 434 is disposed on the side of the brushless motor 430 as the driving part, the structure, the shape, and the size of the valve body as the driven part are not limited, and for example, a needle valve or a spool valve driven by an actuator may be used.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A motorcycle comprising:
    a motorcycle body including a seat on which a driver sits and a foot step on which the driver puts a foot;
    a fuel cell body disposed on the motorcycle body;
    at least two connection ports provided in the fuel cell body; and
    pipe lines that supply at least hydrogen and oxygen to the fuel cell body through the connection ports,
    wherein the fuel cell body is disposed below the seat,
    wherein the connection ports are disposed in a rear side of the foot step, and
    wherein the two connection ports are disposed on both lateral sides of the fuel cell body to be inclined in a direction in which the two connection ports become closer to each other about a vertical plane including a central line of the motorcycle body.

2. The motorcycle according to claim 1, wherein the connection portion is disposed on a lateral side of the motorcycle in a front end of the fuel cell body.

3. The motorcycle according to claim 1, wherein the connection portion is disposed in rear side of a front end of the seat.

4. The motorcycle according to claim 1, wherein the fuel cell body includes:
    a power-generation cell stack in which a plurality of power-generation cells are stacked; and
    a casing member that accommodates the power-generation cell stack,
    wherein the casing member comprises:
        a first end plate disposed at one end in a stack direction of the power-generation cells;
        a second end plate disposed at the other end in the stack direction of the power-generation cells; and
        a plurality of side plates disposed at positions other than the ends,
    wherein the fuel cell body further including:
        a first fixing structure that supports the first end plate so as to be movable in the stack direction of the power-generation cells with respect to the side plates; and
        a second fixing structure that fixes the second end plate so as not to be movable in the stack direction of the power-generation cells with respect to the side plates.

5. The motorcycle according to claim 4, wherein medium supply holes are formed through the first end plate.

6. The motorcycle according to claim 4, wherein edges of the first end plate and edges of the side plates are coupled to each other in an interdigitating manner and are fixed by shearing pins passing through interdigital grooves, and edges of the second end plate and other edges of the side plates are coupled to each other with bolts.

7. The motorcycle according to claim 6, wherein a screw-coupling direction of the bolts is substantially equal to the stack direction of the power-generation cells.

\* \* \* \* \*